United States Patent [19]

Nada

[11] Patent Number: 5,052,177

[45] Date of Patent: Oct. 1, 1991

[54] AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

[75] Inventor: Mitsuhiro Nada, Susono, Japan

[73] Assignee: Toyota Jidosha Kabushiki Kaisha, Aichi, Japan

[21] Appl. No.: 483,017

[22] Filed: Feb. 21, 1990

[30] Foreign Application Priority Data

Mar. 3, 1989 [JP] Japan .................................. 1-50159
Mar. 4, 1989 [JP] Japan .................................. 1-50985

[51] Int. Cl.$^5$ .............................................. F01N 3/20
[52] U.S. Cl. ......................................... 60/274; 60/276
[58] Field of Search ............... 60/274, 276, 285, 289; 123/440, 489, 589

[56] References Cited

U.S. PATENT DOCUMENTS

| | | | |
|---|---|---|---|
| 4,223,644 | 9/1980 | Latsch | 60/276 |
| 4,303,049 | 12/1981 | Ikeura | 123/440 |
| 4,586,893 | 5/1986 | Somerville | 123/489 |
| 4,676,215 | 6/1987 | Blocher | 123/489 |
| 4,817,383 | 4/1989 | Masui | 60/276 |

FOREIGN PATENT DOCUMENTS

| | | |
|---|---|---|
| 52-81438 | 7/1977 | Japan . |
| 56-23531 | 3/1981 | Japan . |
| 56-23532 | 3/1981 | Japan . |
| 56-23533 | 3/1981 | Japan . |
| 56-126647 | 10/1981 | Japan . |
| 56-126648 | 10/1981 | Japan . |
| 56-126649 | 10/1981 | Japan . |
| 56-126650 | 10/1981 | Japan . |
| 57-135243 | 8/1982 | Japan . |
| 58-48745 | 3/1983 | Japan . |
| 1-53042 | 3/1989 | Japan . |

Primary Examiner—Douglas Hart
Attorney, Agent, or Firm—Kenyon & Kenyon

[57] ABSTRACT

In an air-fuel ratio feedback system including a single air-fuel ratio sensor downstream of or within a three-way catalyst converter, a coarse-adjusting term is calculated integrally in accordance with the output of the air-fuel ratio sensor, and a fine-adjusting term is calculated differentially at every reversion of the output of the air-fuel ration sensor, thereby controlling an actual air-fuel ration in accordance with the coarse-adjusting term and the fine-adjusting term. When a time of the reversions of the output of the air-fuel ratio sensor is small, the calculation of the coarse-adjusting term is prohibited.

20 Claims, 28 Drawing Sheets

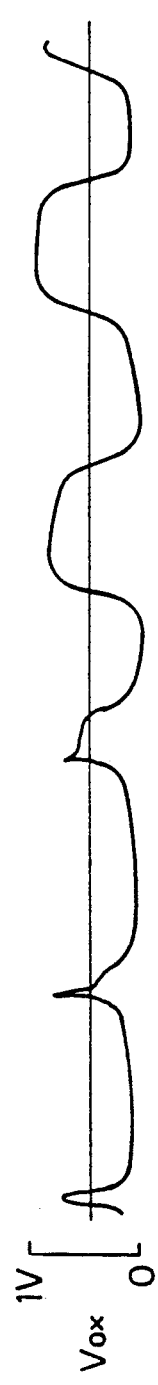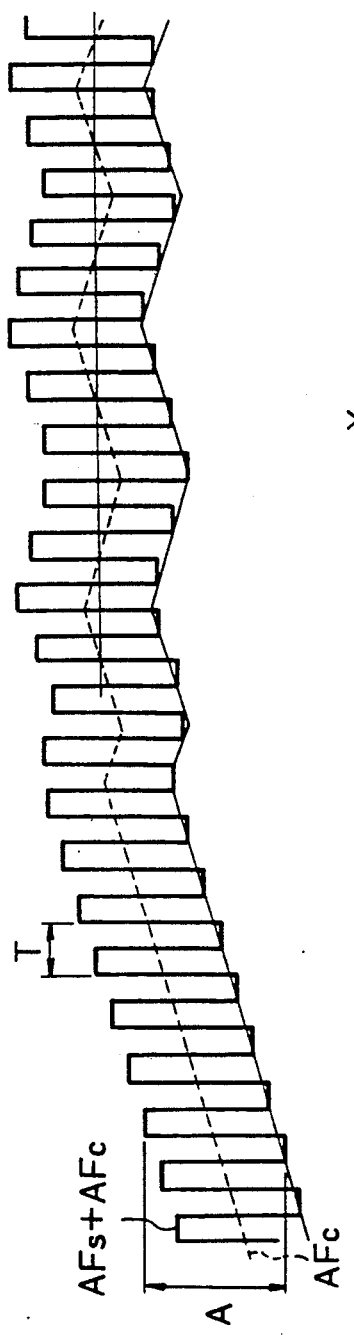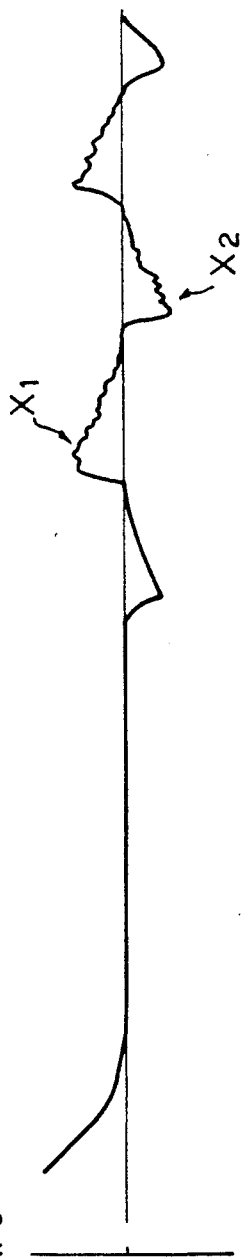

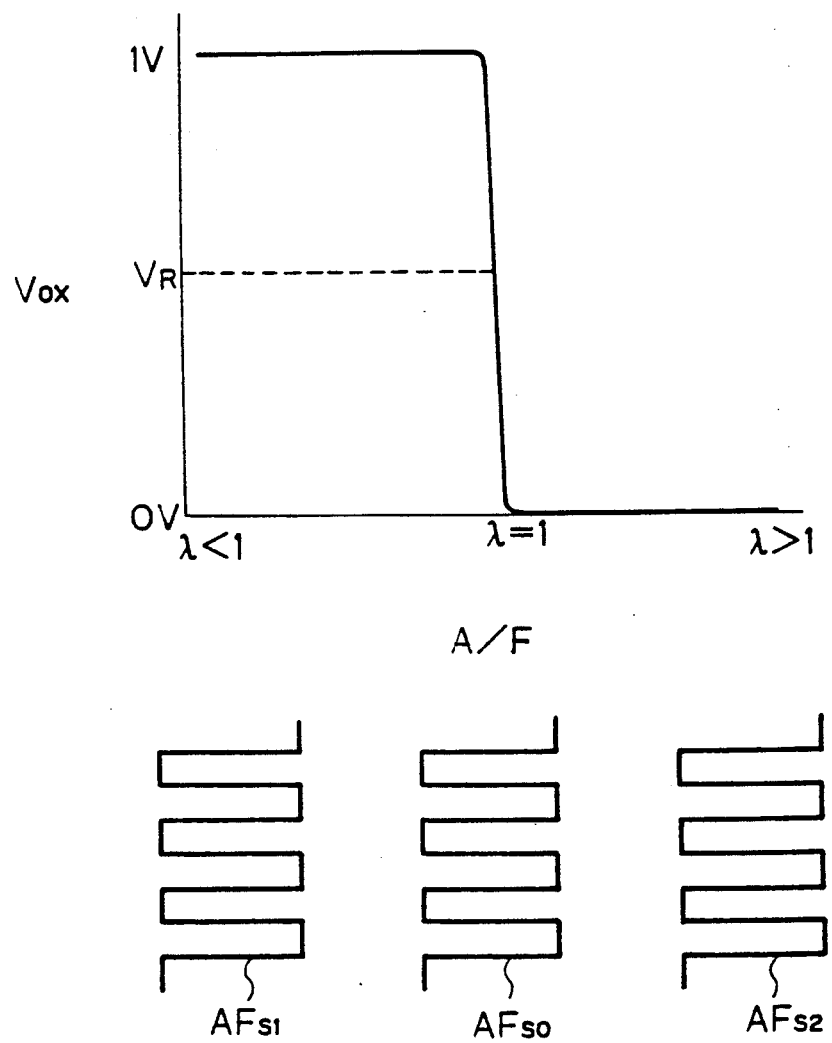

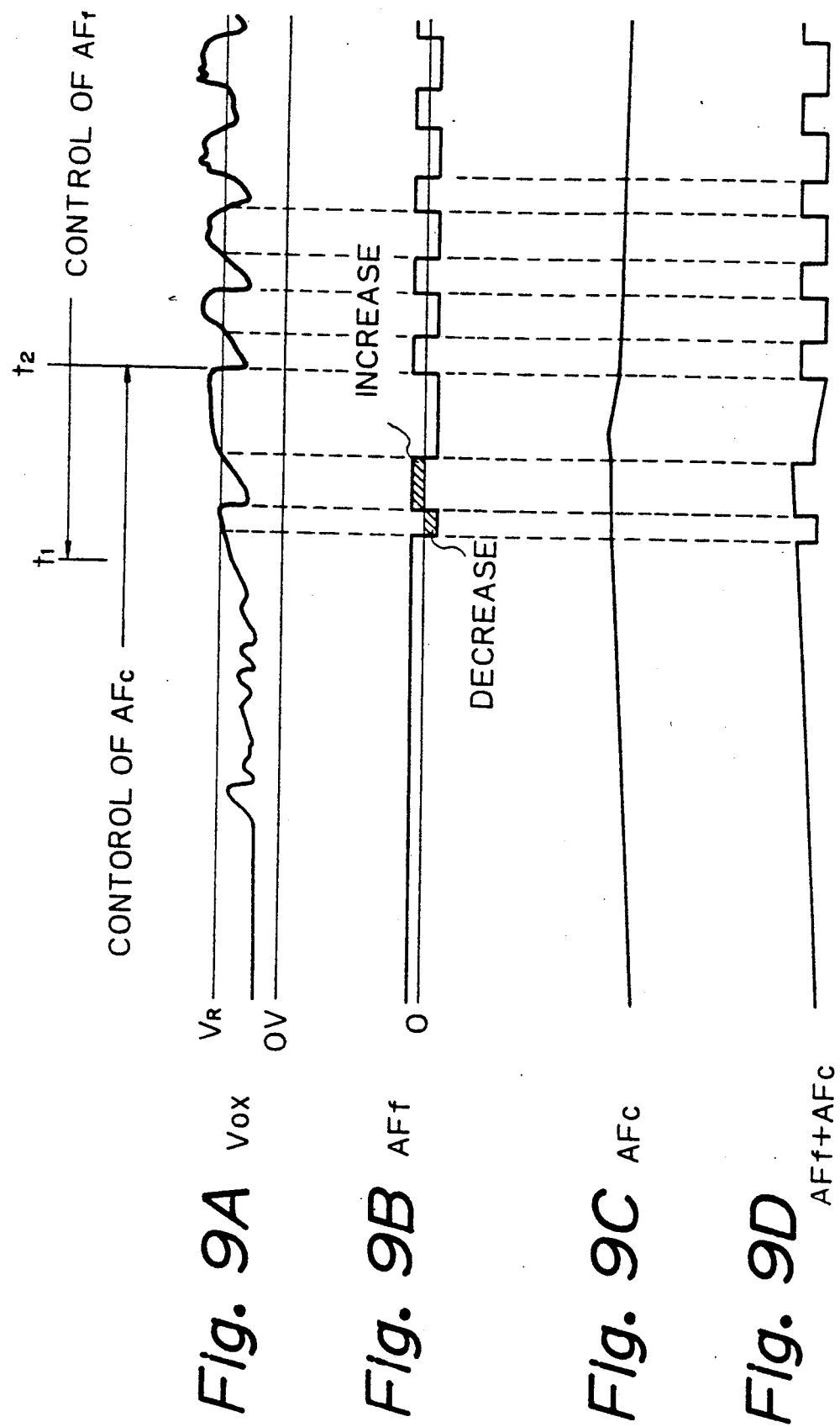

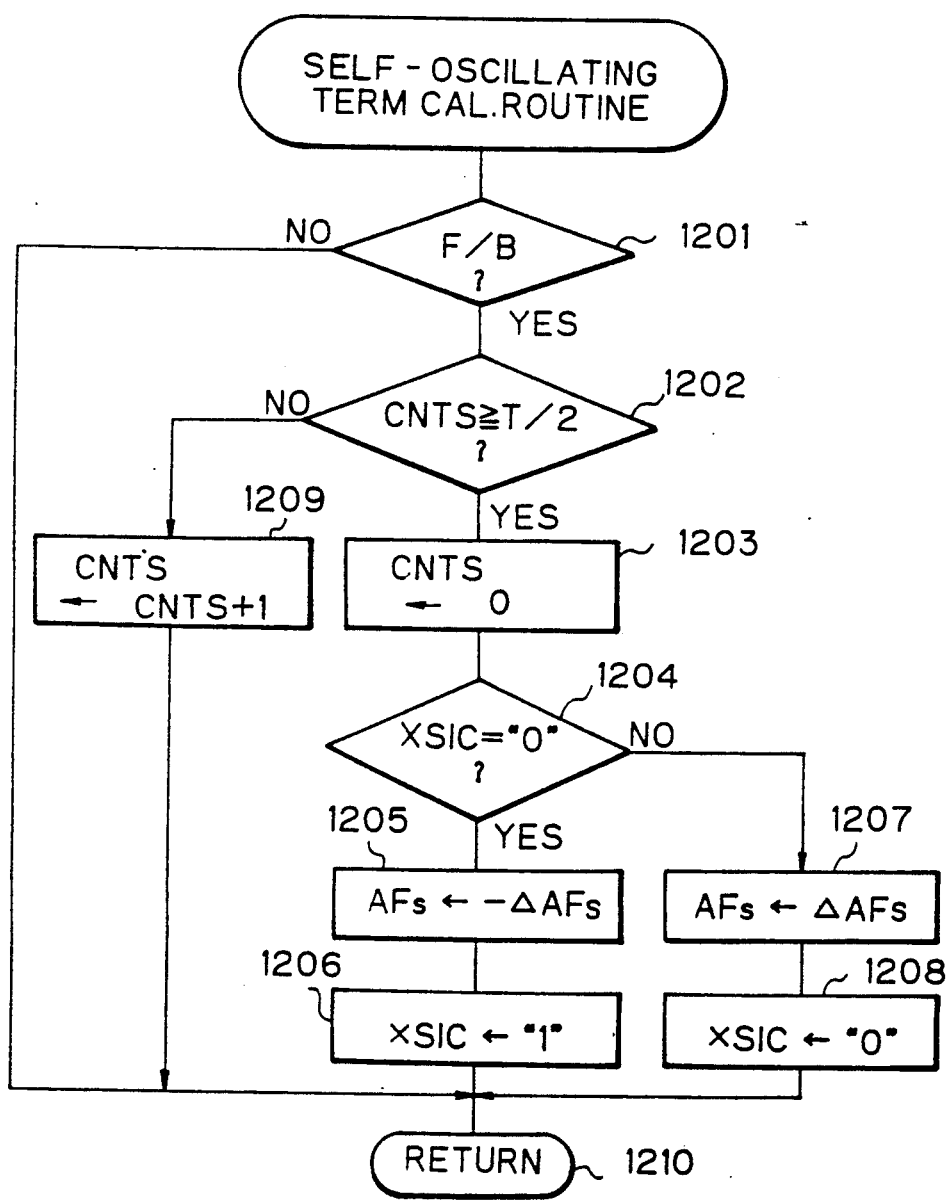

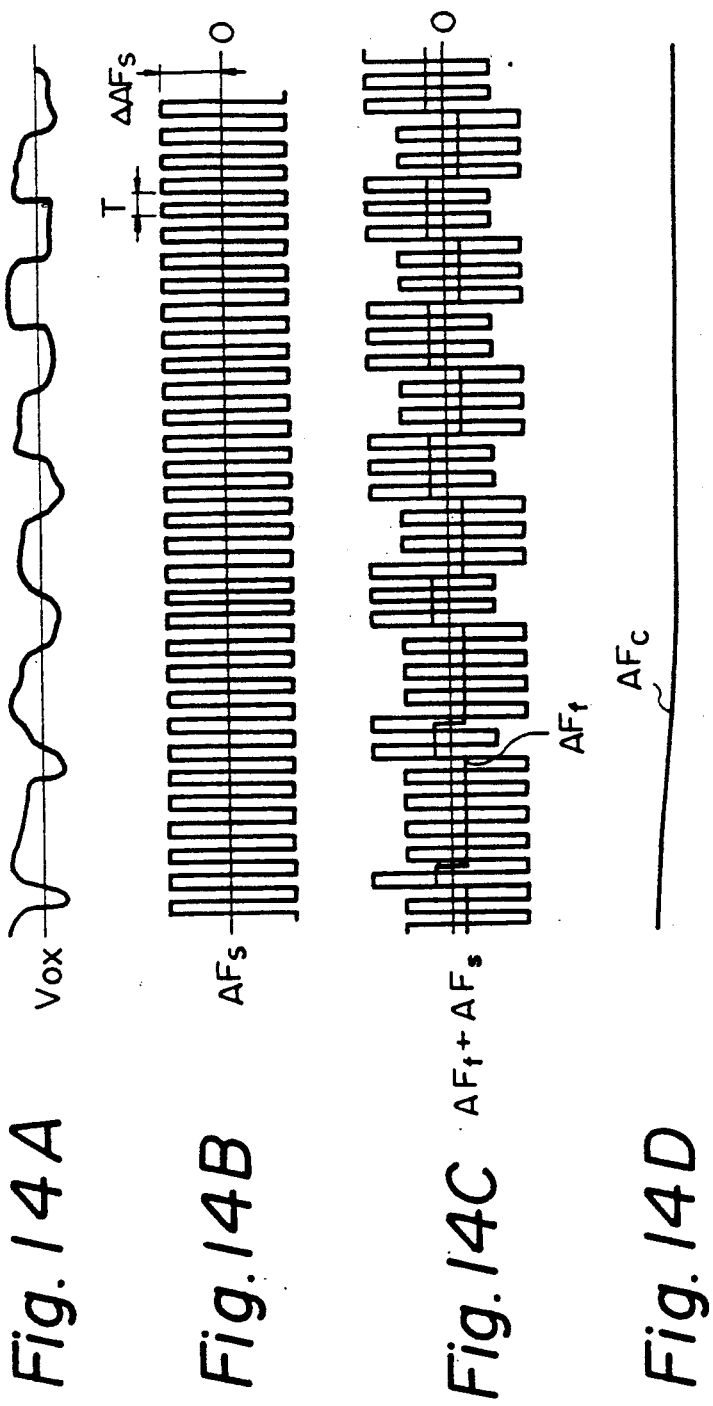

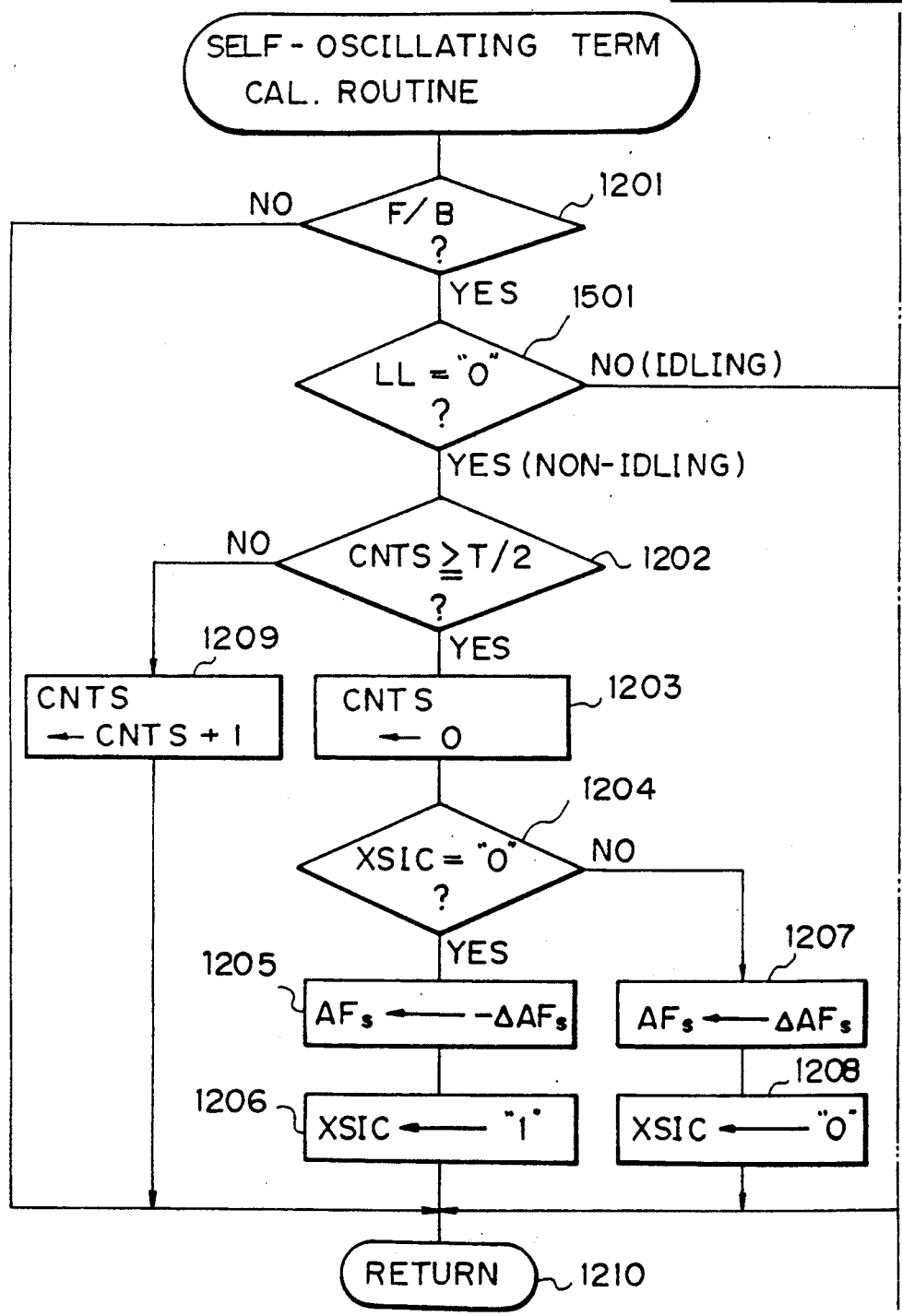

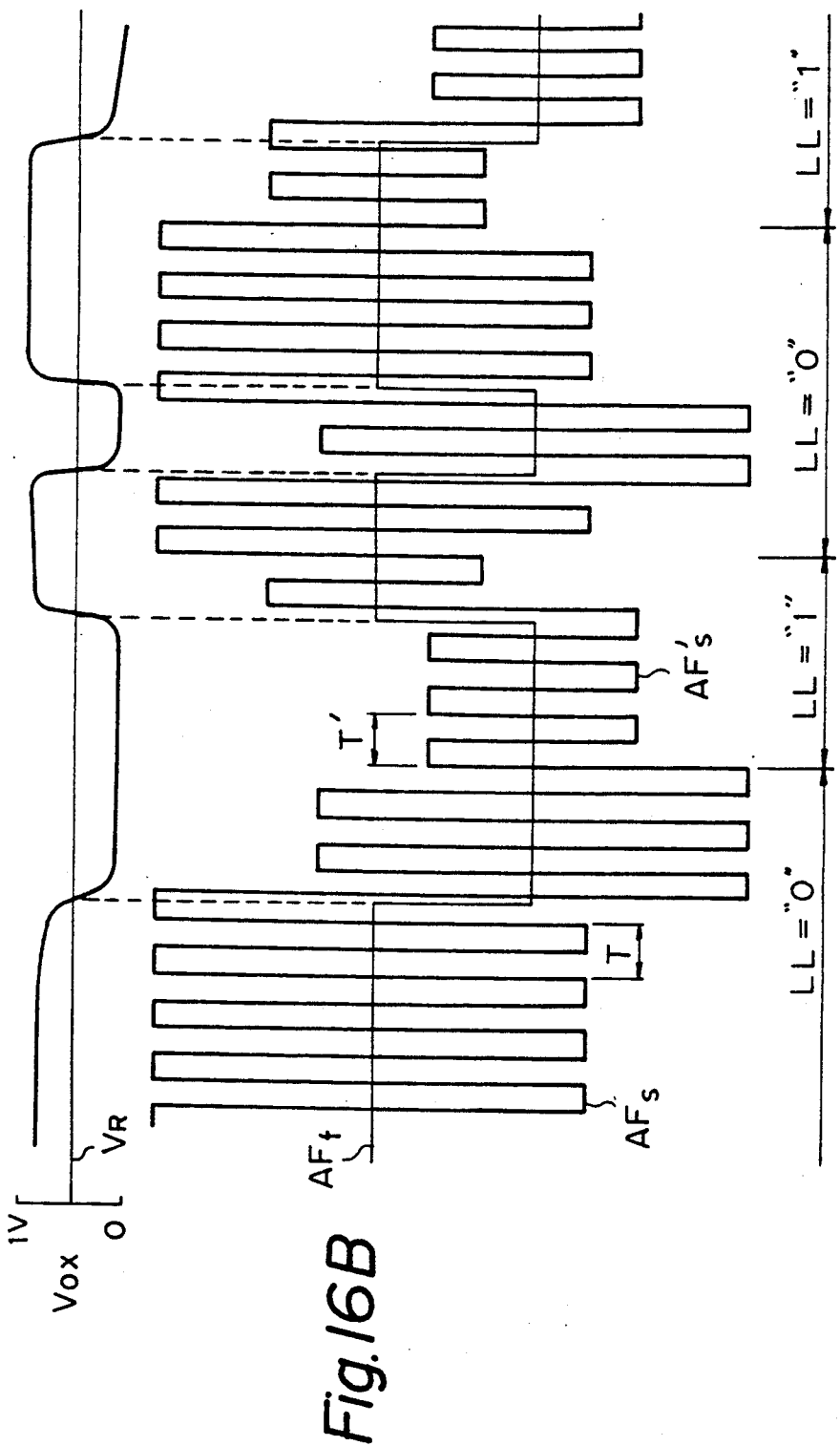

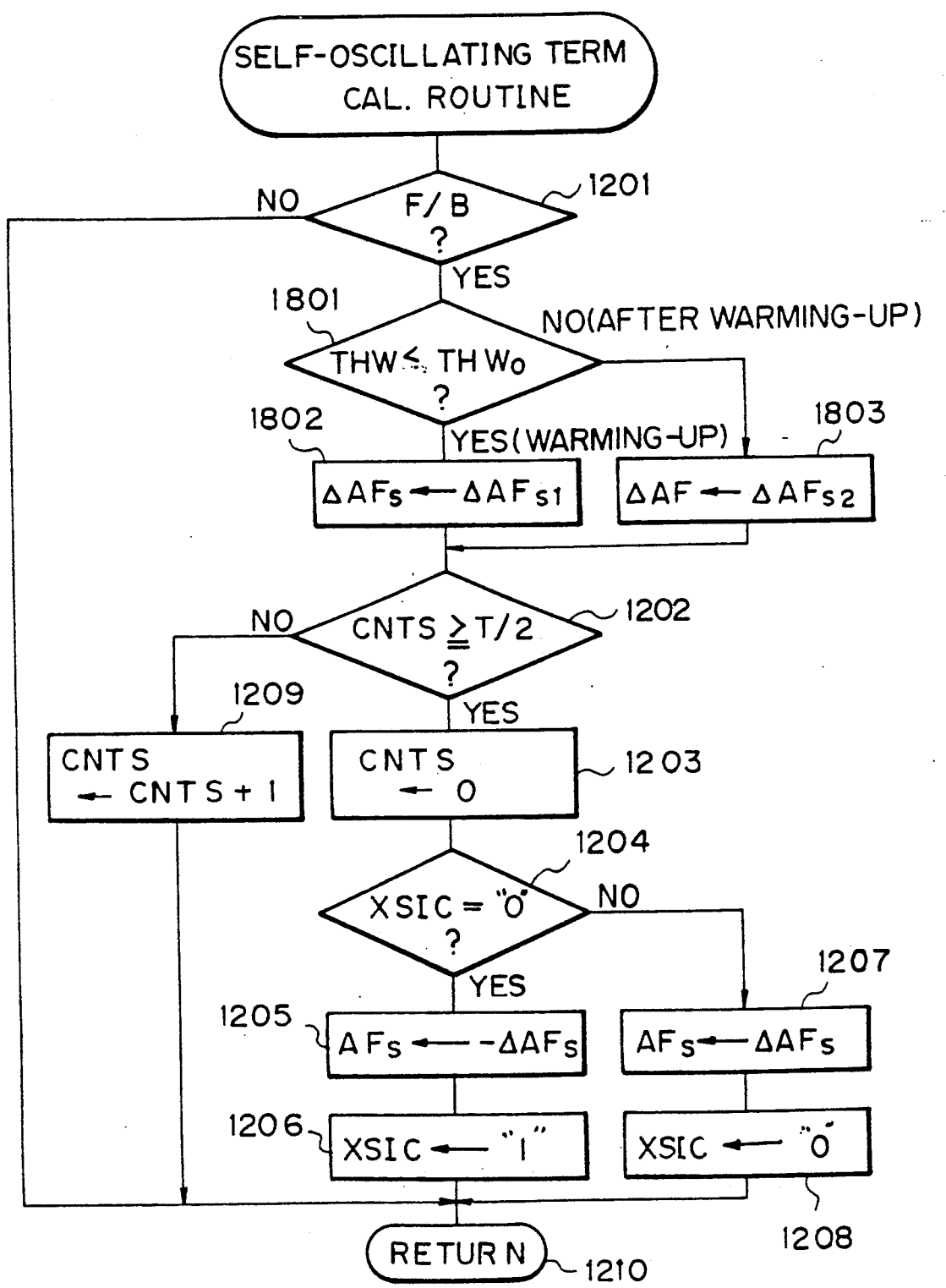

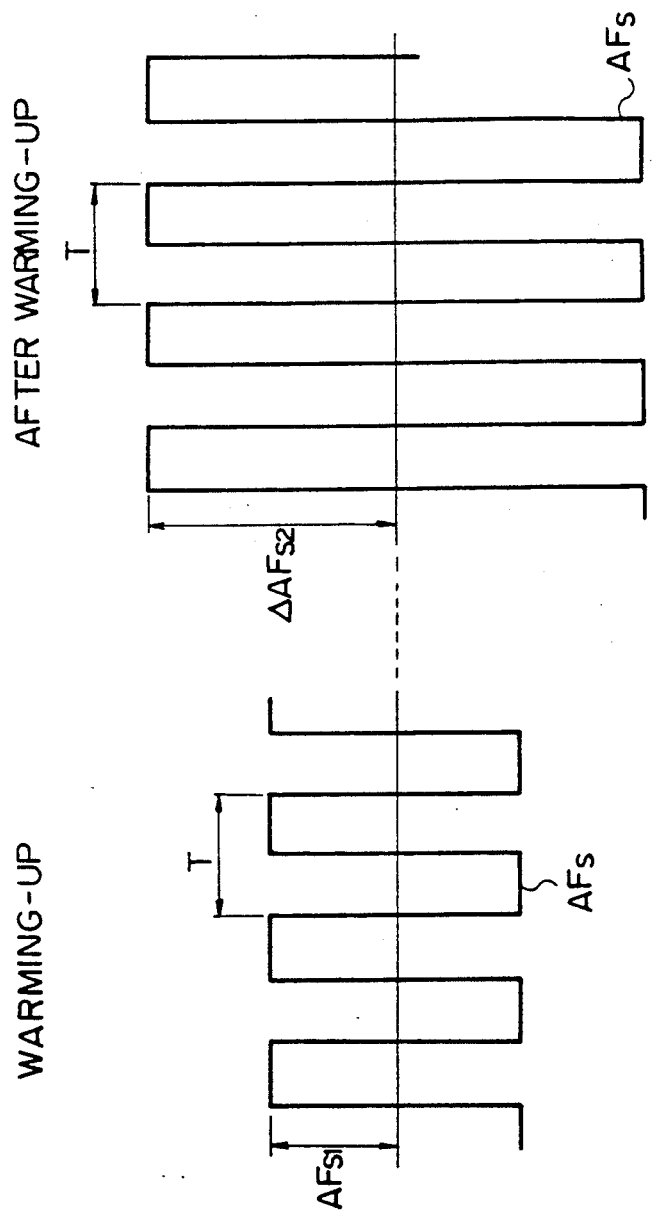

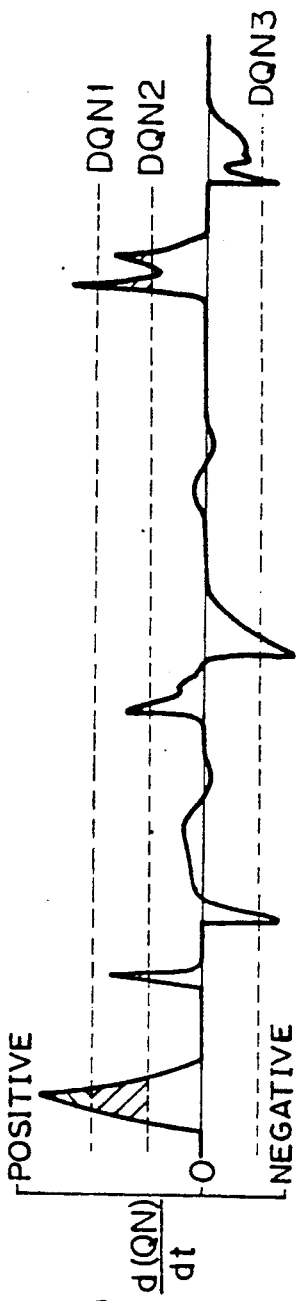
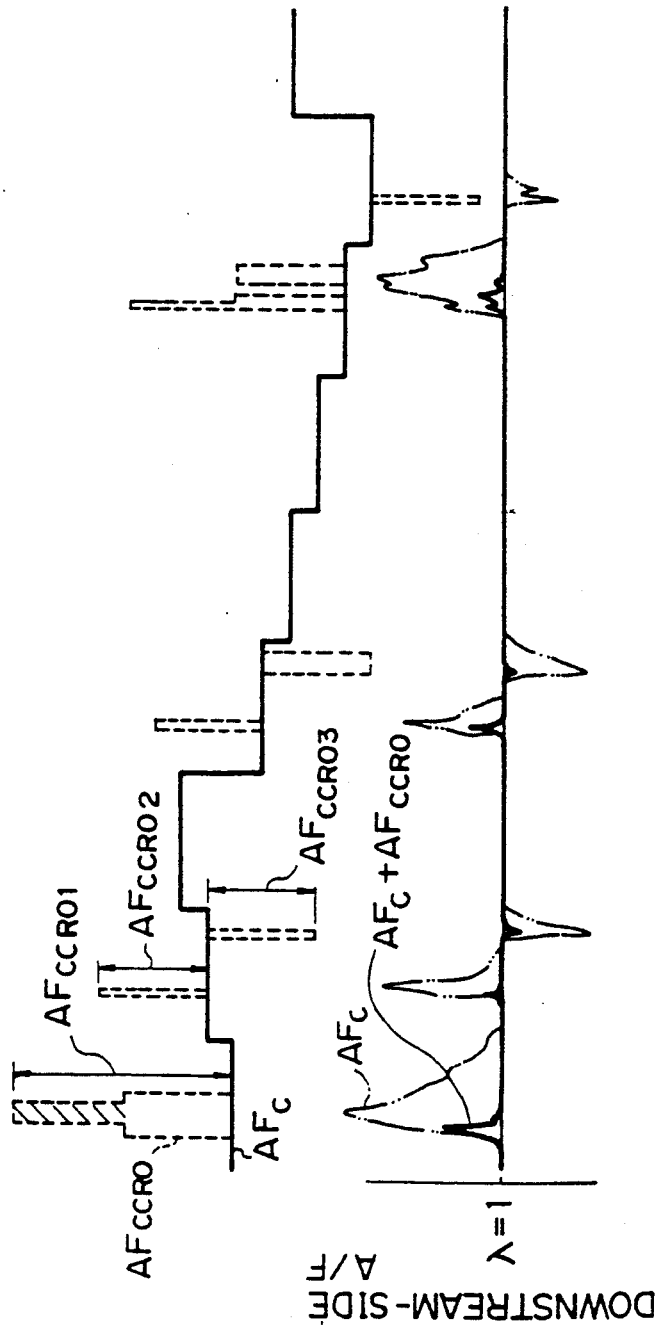
Fig. 23A
Fig. 23B
Fig. 23C

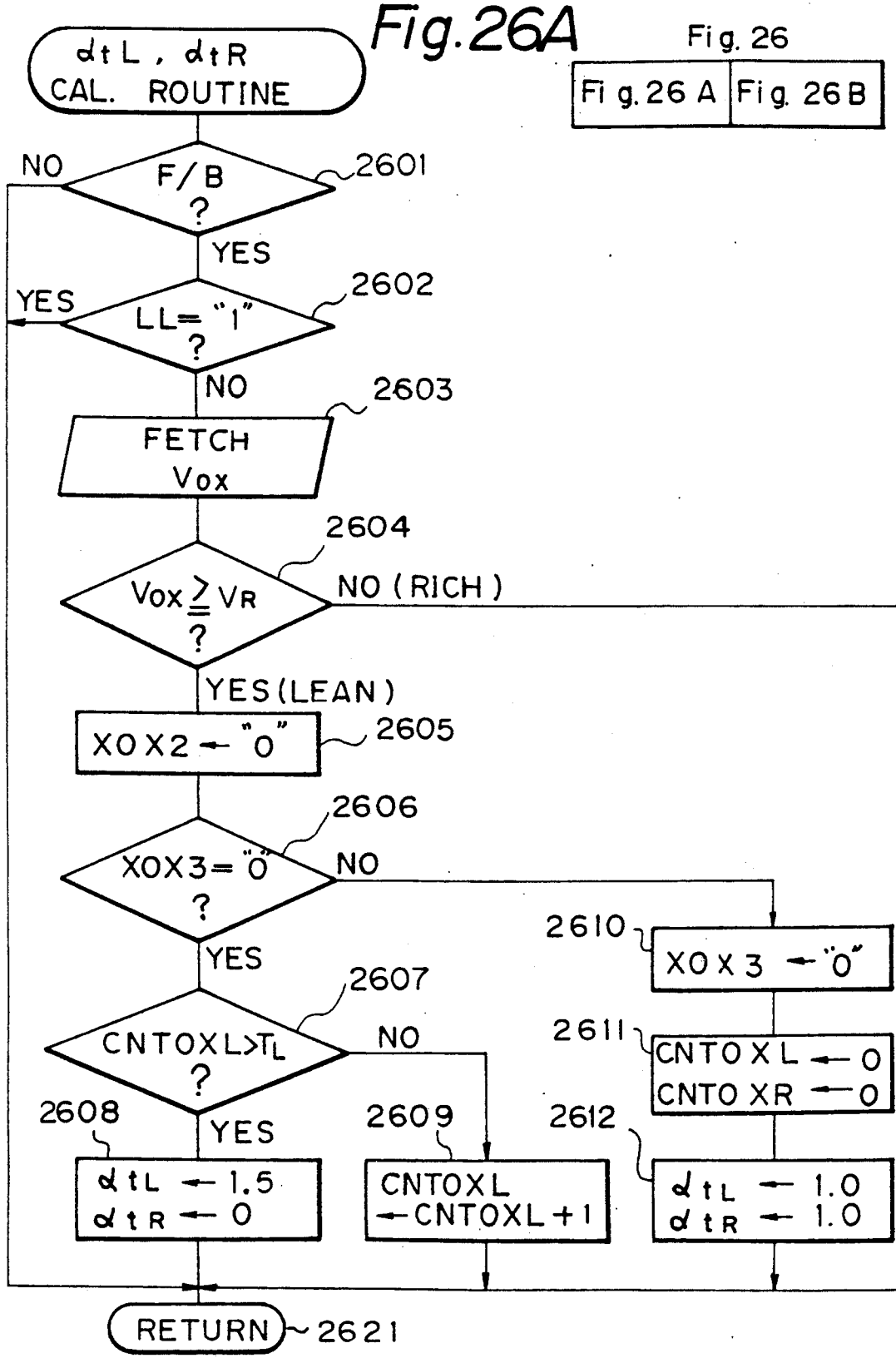

AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

BACKGROUND OF THE INVENTION

1. Field of the Invention

The present invention relates to an air-fuel ratio feedback control system in an internal combustion engine having a single air-fuel ratio sensor downstream of or within a three-way reducing and oxidizing catalyst converter within an exhaust gas passage.

2. Description of the Related Art

As known air-fuel ratio feedback control systems using air-fuel ratio sensors ($O_2$ sensors), there exist a single $O_2$ sensor system having a single $O_2$ sensor and a double $O_2$ sensor system having two $O_2$ sensors one upstream and one downstream of the catalyst converter. Note, in a single $O_2$ sensor system, the $O_2$ sensor is disposed either upstream or downstream of the catalyst converter.

In a single $O_2$ sensor system having an $O_2$ sensor upstream of the catalyst converter, the $O_2$ sensor is disposed in an exhaust gas passage near to a combustion chamber, i.e., near the concentration portion of an exhaust manifold upstream of the catalyst converter. In this system, however, the output characteristics of the $O_2$ sensor are directly affected by the non-uniformity or non-equilibrium of the exhaust gas. For example, when the air-fuel ratio actually indicates a rich state, but oxygen is still present, the output characteristics of the $O_2$ sensor are fluctuated. Also, in an internal combustion engine having a plurality of cylinders, the output characteristics of the $O_2$ sensor are also directly affected by individual differences between the cylinders, and accordingly, it is impossible to detect the mean air-fuel ratio within the entire engine, and thus the accuracy of the controlled air-fuel ratio is low.

On the other hand, in a single $O_2$ sensor system having an $O_2$ sensor downstream of the catalyst converter, the non-uniformity or non-equilibrium of the detected exhaust gas can be eliminated, and the mean air-fuel ratio within the entire engine can be detected. In this system, however, due to the long distance between the $O_2$ sensor and the exhaust valves, and because the capacity and cleaning efficiency of the catalyst converter depends upon its $O_2$ storage effect, the response characteristics of the $O_2$ sensor are lowered, thus reducing the response characteristics of an air-fuel ratio feedback control system. As a result, the efficiency of the catalyst converter cannot be sufficiently exhibited, thus increasing HC, CO, and $NO_x$ emissions.

Also, in the above-mentioned double $O_2$ sensor system, an air-fuel ratio feedback control operation is carried out by the downstream $O_2$ sensor in addition to an air-fuel ratio feedback control operation by the upstream $O_2$ sensor. For example, the mean air-fuel ratio is detected by the downstream $O_2$ sensor to reflect an air-fuel ratio feedback parameter such as skip amounts, and the air-fuel ratio feedback control for the entire system is carried out by the output of the upstream $O_2$ sensor and the air-fuel ratio feedback control parameter (see U.S. Pat. No. 4,693,076). Therefore, even if the output characteristics of the downstream $O_2$ sensor are not stable, good emission characteristics are obtained. In this double $O_2$ sensor system, however, two $O_2$ sensors are required, thus increasing the manufacturing cost, and further, when the frequency of the air-fuel ratio feedback control by the upstream $O_2$ sensor is increased by the aging of the parts of the engine or the like, the efficiency of the catalyst converter is lowered.

In view of the foregoing, the present inventor has already suggested a single $O_2$ sensor system having a downstream $O_2$ sensor in which a self-oscillating term $AF_s$ having a definite amplitude and a definite period is generated, and a mean value $AF_c$ of the self-oscillating term $AF_s$ is changed in accordance with the output of the downstream $O_2$ sensor, to thereby exhibit a full efficiency of the catalyst converter (see Japanese Unexamined Patent Publication (Kokai) No. 64-66441 published on Mar. 31, 1989). This single $O_2$ sensor system, however, does not provide a sufficient reduction of HC, CO, and $NO_x$ emissions, which will be later explained.

SUMMARY OF THE INVENTION

Therefore, an object of the present invention is to provide a single air-fuel ratio sensor system having an improved and superior cleaning-up function.

According to the present invention, in an air-fuel ratio feedback system including a single air-fuel ratio sensor downstream of or within a three-way catalyst converter, a coarse-adjusting term $AF_c$ is calculated integrally in accordance with the output of the air-fuel ratio sensor, and a fine-adjusting term $AF_f$ is calculated differentially at every reversion of the output of the air-fuel ratio sensor, thereby controlling an actual air-fuel ratio in accordance with the coarse-adjusting term $AF_c$ and the fine-adjusting term $AF_f$. When a time for the reversions of the output of the air-fuel ratio sensor is short, the calculation of the coarse-adjusting term is prohibited.

That is, the center of the controlled air-fuel ratio is oscillated at a self duty-ratio determined by the fine-adjusting term $AF_f$ generated by the reversions of the output of the air-fuel ratio. Therefore, when the controlled air-fuel ratio is not converged to the stoichiometric air-fuel ratio ($\lambda = 1$), i.e., when the controlled air-fuel ratio is declined to a lean air-fuel ratio ($\lambda > 1$) or a rich air-fuel ratio ($\lambda < 1$), the fine-adjusting term $AF_f$ is not oscillated and accordingly, the center of the controlled air-fuel ratio is dependent upon only the coarse-adjusting term $AF_c$. In this case, the center of the controlled air-fuel ratio is integrally controlled. Conversely, when the center of the controlled air-fuel ratio is converged to the stoichiometric air-fuel ratio ($\lambda = 1$), it is oscillated by the fine-adjusting term $AF_f$ to fully exhibit a cleaning function of the three-way catalyst converter, and the calculation of the coarse-adjusting term $AF_c$ is prohibited to maintain the above-mentioned full cleaning function of the three-way catalyst converter.

BRIEF DESCRIPTION OF THE DRAWINGS

The present invention will be more clearly understood from the description as set forth below with reference to the accompanying drawings.

FIGS. 1A, 1B, and 1C are timing diagrams showing the inventor's suggested single air-fuel sensor system;

FIG. 2 is a graph showing the relationship between a self-oscillating wave and a cleaning function of a three-way catalyst converter;

FIGS. 4, 6, 8, 10, 12, 13, 15, 17, 18, 21, 22, 24, 25, 26A and 26B are flow charts showing the operation of the control circuit of FIG. 3;

FIGS. 9A, 9B, 9C, and 9D are timing diagrams explaining the flow charts of FIGS. 4, 6, and 8;

FIGS. 14A, 14B, 14C, and 14D are timing diagrams explaining the flow charts of FIGS. 4, 6, 12, and 13;

FIGS. 16A and 16B are timing diagrams explaining the flow charts of FIG. 15;

FIG. 19 is a timing diagram explaining the flow chart of FIG. 18;

FIGS. 23A, 23B, and 23C are timing diagrams explaining the flow charts of FIGS. 4, 6, 21, and 22.

DESCRIPTION OF THE PREFERRED EMBODIMENTS

First, the inventor's suggested single air-fuel ratio sensor system having a single downstream $O_2$ sensor will be explained with reference to FIGS. 1A, 1B, 1C, and 2. When the output $V_{ox}$ of the downstream $O_2$ sensor is changed as shown in FIG. 1A, the center of the self-oscillating term $AF_s$ having a definite amplitude A and a definite period T, i.e., the coarse-adjusting term $AF_c$, is charged in accordance with the output $V_{ox}$ of the $O_2$ sensor. In this case, when the output $V_{ox}$ of the $O_2$ sensor indicates a lean state, the coarse-adjusting term $AF_c$ is gradually increased, and when the output $V_{ox}$ of the $O_2$ sensor indicates a rich state, the coarse-adjusting term $AF_c$ is gradually decreased; i.e., the coarse-adjusting term $AF_c$ is integrally controlled. Note that FIG. 1C shows the actual air-fuel ratio.

Referring to FIG. 2, when the self-oscillating term $AF_s$ ($=AF_{so}$) is oscillated around the stoichiometric air-fuel ratio ($\lambda=1$), the three-way catalyst converter exhibits a full cleaning function. Conversely, when the self-oscillating term $AF_s$, which corresponds to $AF_{s1}$ or $AF_{s2}$, is oscillated around a rich air-fuel ratio ($\lambda<1$) or a lean air-fuel ratio ($\lambda>1$), the three-way catalyst converter cannot exhibit a full cleaning function. Therefore, to move the self-oscillating term $AF_{s1}$ or $AF_{s2}$ to $AF_{s0}$, the coarse-adjusting term (integration term) $AF_c$ is introduced into the control of the air-fuel ratio.

Nevertheless, even when the coarse-adjusting term $AF_c$ is introduced, the response characteristics of the $O_2$ sensor are changed in accordance with the flow amount and rate of the gas, the exposure of the gas, the composition of the gas, a purge time for which the $O_2$ sensor remains in a rich or lean air-fuel ratio atmosphere, and the like. Therefore, if the response characteristics of the $O_2$ sensor can effectively respond to the frequency of the self-oscillating term $AF_s$, no problem occurs, but since this type of $O_2$ sensor is located downstream of the three-way catalyst converter, the response characteristics of the $O_2$ sensor are poor due to the $O_2$ storage effect of the three-way catalyst converter. Thus, as indicated by $X_1$ and $X_2$ in FIG. 1C, convergence errors are generated in the air-fuel ratio downstream of the three-way catalyst converter due to the difference in phase between the gas introduced into the three-way catalyst converter and the gas discharged therefrom, and as a result, the reduction of HC, CO, and $NO_x$ emissions is insufficient.

Figure 3:
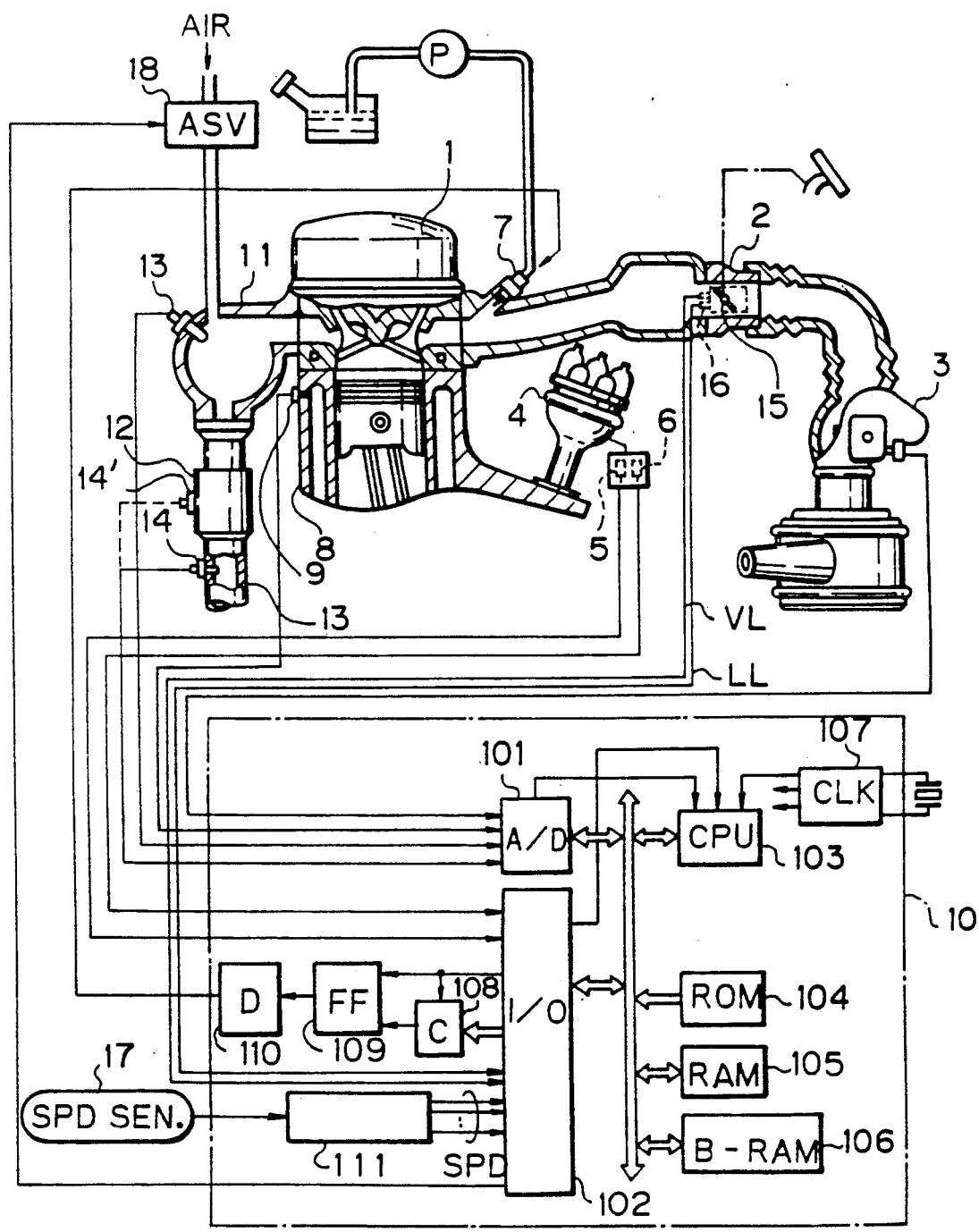
FIG. 3 is a schematic view of an internal combustion engine according to the present invention.

In FIG. 3, which illustrates an internal combustion engine according to the present invention, reference numeral 1 designates a four-cycle spark ignition engine disposed in an automotive vehicle. An air-intake passage 2 of the engine 1 is provided with a potentiometer-type airflow meter 3 for detecting the amount of air drawn into the engine 1, to generate an analog voltage signal in proportion to the amount of air flowing therethrough. The signal of the airflow meter 3 is transmitted to a multiplexer-incorporating analog-to-digital (A/D) converter 101 of a control circuit 10.

Disposed in a distributor 4 are crank angle sensors 5 and 6 for detecting the angle of the crank-shaft (not shown) of the engine 1.

In this case, the crank angle sensor 5 generates a pulse signal at every 720° crank angle (CA) and the crank-angle sensor 6 generates a pulse signal at every 30° CA. The pulse signals of the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

Also provided in the air-intake passage 2 is a fuel injection valve 7 for supplying pressurized fuel from the fuel system to the air-intake port of the cylinder of the engine 1. In this case, other fuel injection valves are provided for other cylinders, but these are not shown in FIG. 3.

Disposed in a cylinder block 8 of the engine 1 is a coolant temperature sensor 9 for detecting the temperature of the coolant. The coolant temperature sensor 9 generates an analog voltage signal in response to the temperature THW of the coolant, and transmits that signal to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided in an exhaust pipe 13 downstream of the catalyst converter 12 is an $O_2$ sensor 14 for detecting the concentration of oxygen composition in the exhaust gas. The $O_2$ sensor 14 generates a output voltage signal and transmits the signal to the A/D converter 101 of the control circuit 10. Note that an $O_2$ sensor 14' can be located within the catalyst converter 12, instead of the $O_2$ sensor 14 downstream of the catalyst converter 12.

Reference 15 designates a throttle valve, and 16 designates a throttle sensor which incorporates an idle switch for detecting when the throttle valve 15 is fully closed, and a full switch for detecting whether or not the opening of the throttle valve 15 is larger than a predetermined value, such as 70°. The output LL of the idle switch and the output VL of the full switch are supplied to the I/O interface 102 of the control circuit 10.

Reference 17 designates a vehicle speed sensor formed, for example, by a permanent magnet and a lead switch. The output of the vehicle speed sensor 17 is supplied to a vehicle speed forming circuit 111 of the control circuit 10, which circuit 111 generates binary data inversely proportional to the vehicle speed SPD.

Reference 18 designated an air suction valve of a secondary air supply system. When the engine is in a predetermined deceleration state or an idling state, the air suction valve 18 is opened to introduce secondary air into the exhaust manifold 11, thus reducing the HC and CO emissions. Also, when the coolant temperature THW is low, the air suction valve 18 is closed to stop the introduction of secondary air into the exhaust manifold 11, thereby preventing overheating of the exhaust system. The air suction valve 18 is controlled, via a vacuum switch valve (not shown), by the control circuit 10 using the data of the engine speed $N_e$, the vehicle speed SPD, the idle switch LL, the coolant temperature THW and the like.

The control circuit 10, which may be constructed by a microcomputer, further comprises a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note, that the battery (not shown) is connected directly to the backup RAM 106 and, therefore, the content thereof is not erased even when the ignition switch (not shown) is turned OFF.

The down counter 108, the flip-flop 109, and the driver circuit 110 are used for controlling the fuel injection valve 7. Namely, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105; i.e., the data Q and THW in the RAM 105 are renewed at predetermined intervals. The engine speed $N_e$ is calculated by an interrupt routine executed at 30° CA., i.e., at every pulse signal of the crank angle sensor 6, and is then stored in the RAM 105.

Figure 4:
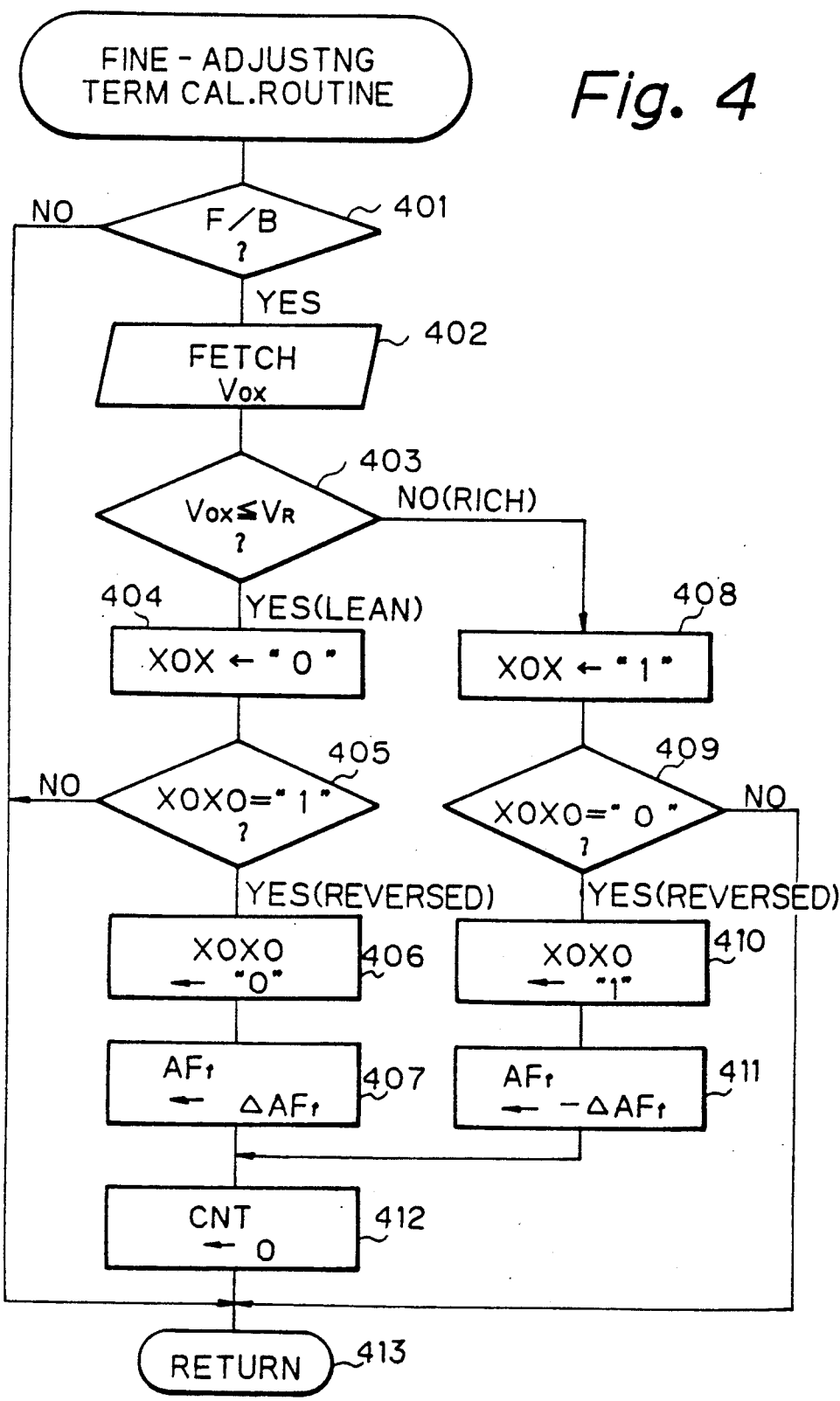

FIG. 4 is a routine for calculating a fine-adjusting term $AF_f$ in accordance with the output $V_{ox}$ of the $O_2$ sensor 14 executed at a predetermined time such as 4 ms.

At step 401, it is determined whether or not all of the feedback control (closed-loop control) conditions by the $O_2$ sensor 14 are satisfied. The feedback control conditions are as follows.
  i) the coolant temperature THW is higher than 40° C.;
  ii) the engine is not in a starting state;
  iii) the engine is not in a fuel incremental state after a starting state;
  iv) the power fuel incremental amount FPOWER is 0, i.e., the full switch VL of the throttle sensor 17 is turned OFF;
  v) the engine is not in a fuel cut-off state;
  vi) the $O_2$ sensor 14 is in an activated state; and
  vii) the secondary air-suction in accordance the output LL of the idle switch, and the coolant temperature THW, and the like is not carried out.

Note that the determination of activation/nonactivation of the $O_2$ sensor 14 is carried out by determining whether or not the output voltage $V_x$ of the $O_2$ sensor 14 is lower than a predetermined value. Of course, other feedback control conditions are introduced as occasion demands, but an explanation of such other feedback control conditions is omitted.

If one or more of the feedback control conditions is not satisfied, the control proceeds to step 413, to thereby carry out an open-loop control operation.

Contrary to the above, at step 401, if all of the feedback control conditions are satisfied, the control proceeds to step 402.

At step 402, an A/D conversion is performed upon the output voltage $V_{OX}$ of the $O_2$ sensor 14, and the A/D converted value thereof is then fetched from the A/D converter 101. Then at step 403, the voltage $V_{OX}$ is compared with a reference voltage $V_R$ such as 0.45 V, thereby determining whether the current air-fuel ratio detected by the $O_2$ sensor 14 is on the rich side or on the lean side with respect to the stoichiometric air-fuel ratio.

Figure 5:
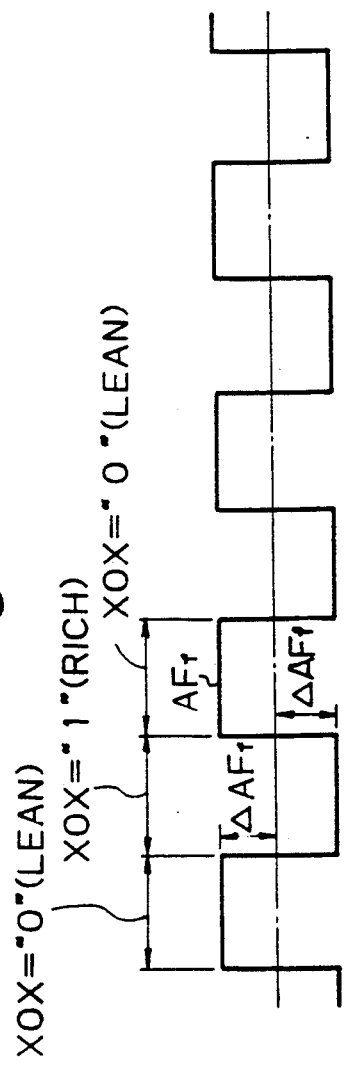
FIG. 5 is a timing diagram explaining the flow chart of FIG. 4.

If $V_{OX} \leq V_R$, which means that the current air-fuel ratio is lean, the control proceeds to step 404, which sets "0" in an air-fuel ratio flag XOX. At step 405, it is determined whether or not a previous air-fuel ratio flag XOXO is "1" (rich), i.e., the air-fuel ratio flag XOX is reversed. As a result, only when the air-fuel ratio flag XOX is reversed does the control proceed to step 406, which causes the fine-adjusting term $AF_f$ to be $\Delta AF_f$ (definite) as shown in FIG. 5. Then the control proceeds to step 412.

On the other hand, at step 403, if $V_{OX} > V_R$, which means that the current air-fuel ratio is rich, the control proceeds to step 408, which sets "1" in the air-fuel ratio flag XOX. At step 409, it is determined whether or not the previous air-fuel ratio flag XOXO is "0" (lean), i.e., the air-fuel ratio flag XOX is reversed. As a result, only when the air-fuel ratio flag XOX is reversed does the control proceed to step 410, which causes the fine-adjusting term $AF_f$ to be $-\Delta AF_f$ (definite) as shown in FIG. 5. Then the control proceeds to step 412.

At step 412, a counter value CNT is cleared. This counter value CNT is used for counting a reversion period of the output $V_{OX}$ of the $O_2$ sensor 14 in a routine of FIG. 6, which will be later explained.

Then, at step 413, the routine of FIG. 4 is completed.

Thus, according to the routine of FIG. 4, the fine-adjusting term $AF_f$ has a waveform which is skipped at every reversion of the output $V_{OX}$ of the $O_2$ sensor 14 as shown in FIG. 5. Namely, the control of the fine-adjusting term $AF_f$ corresponds to a skip control, and thus, a self-oscillating waveform is formed by the output $V_{OX}$ of the $O_2$ sensor 14 per se.

Figure 6:
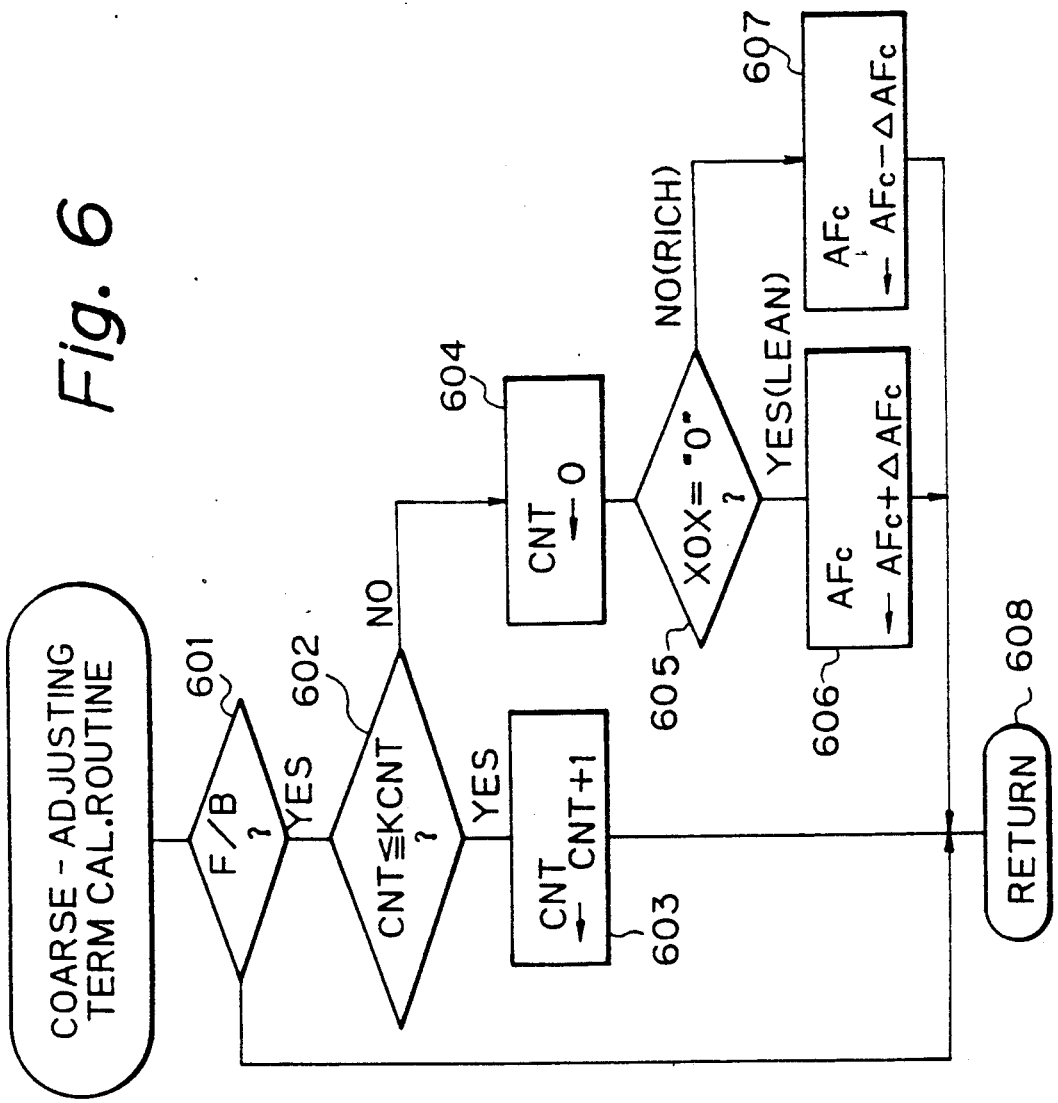

FIG. 6 is a routine for calculating a coarse-adjusting term $AF_c$ in accordance with the output $V_{OX}$ of the $O_2$ sensor 14 executed at a predetermined time such as 64 ms. At step 601, it is determined whether or not all of the feedback control conditions are satisfied, as at step 401 of FIG. 4. As a result, when one or more of the feedback control conditions are not satisfied, the control proceeds directly to step 608. When all of the feedback control conditions are satisfied, the control proceeds to step 602, which determines whether or not the counter value CNT has reached a definite value KCNT. Note that the counter value CNT is cleared at every reversion of the output $V_{OX}$ of the $O_2$ sensor 14, as explained above.

Therefore, first the control at step 602 proceeds to step 603, which increases the counter value CNT by +1, thus completing this routine at step 608. Finally, when the counter value CNT reaches the definite value KCNT, i.e., when a time of KCNT×64 ms has passed, the control proceeds to steps 604 through 607.

At step 604, the counter value CNT is cleared, and at step 605 it is determined whether or not XOX="0", i.e., whether the current air-fuel ratio downstream of the catalyst converter 12 is lean ("0") or rich ("1"). As a result, if lean ("1"), the control proceeds to step 606 which increases the coarse-adjusting term $AF_c$ by $\Delta AF_c$ (definite), and if rich ("1'"), the control proceeds to step 607 which decreases the coarse-adjusting term $AF_c$ by $-\Delta AF_c$. Then the control proceeds to step 608.

Note that the definite value $\Delta AF_c$ is smaller than the skip amount $\Delta AF_f$ at steps 407 and 411 of FIG. 4, i.e., $$\Delta AF_c < \Delta AF_f$$

Figure 7:
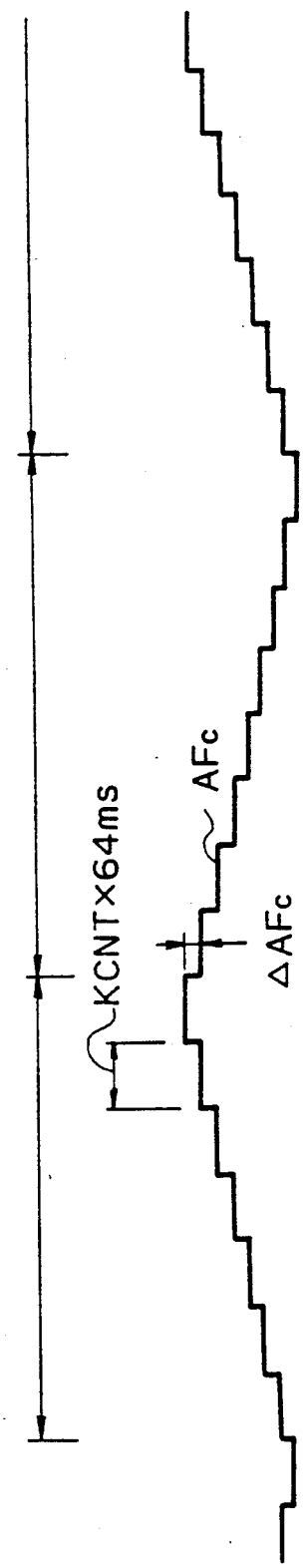
FIG. 7 is a timing diagram explaining the flow chart of FIG. 6.

Therefore, as shown in FIG. 7, when the air-fuel ratio downstream of the catalyst converter 12 is lean (XOX="0"), the coarse-adjusting term $AF_c$ is gradually increased at a rate of $\Delta AF_c$, and when the air-fuel ratio downstream of the catalyst converter 12 is rich (XOX="1"), the coarse-adjusting term $AF_c$ is gradually decreased at the rate of $\Delta AF_c$. Thus, the control of the coarse-adjusting term $AF_c$ corresponds to an integral control.

The substantial execution and non-execution of the routine of the coarse-adjusting term $AF_c$ is dependent upon the non-execution and execution of the routine of the fine-adjusting term $AF_f$, respectively. Namely, when the air-fuel ratio downstream of the catalyst converter 12 is shifted from the stoichiometric air-fuel ratio, $V_{OX} \leq V_R$ (lean) or $V_{OX} > V_R$ (rich) is retained, so that the fine-adjusting term $AF_f$ is retained at $\Delta AF_f$ or $-\Delta AF_f$ by the routine of FIG. 4. As a result, the counter value CNT is not cleared by step 412 of FIG. 4. In this case, the coarse-adjusting term $AF_c$ is increased or decreased at a time of KCNT×64 ms. Thus, the control of the coarse-adjusting term $AF_c$ has priority over the control of the fine-adjusting term $AF_f$.

Conversely, when the air-fuel ratio downstream of the catalyst converter 12 is converged into the stoichiometric air-fuel ratio, the output $V_{OX}$ of the $O_2$ sensor 14 is often reversed, i.e., the reversion period of the output $V_{OX}$ of the $O_2$ sensor 14 becomes short, thus frequently moving the fine-adjusting term $AF_f$ between $\Delta AF_f$ and $-\Delta AF_f$. In this case, the counter value CNT is cleared by step 412 of FIG. 4 before the counter value CNT reaches the definite value KCNT, and as a result, the control at step 602 of FIG. 6 always proceeds to step 603. Therefore, the coarse-adjusting term $AF_c$ is not increased or decreased, i.e., the calculation of the coarse-adjusting term $AF_c$ is prohibited and held at a specific value. Thus, the control of the fine-adjusting term $AF_f$ has priority over the control of the coarse-adjusting term $AF_c$.

Figure 8:
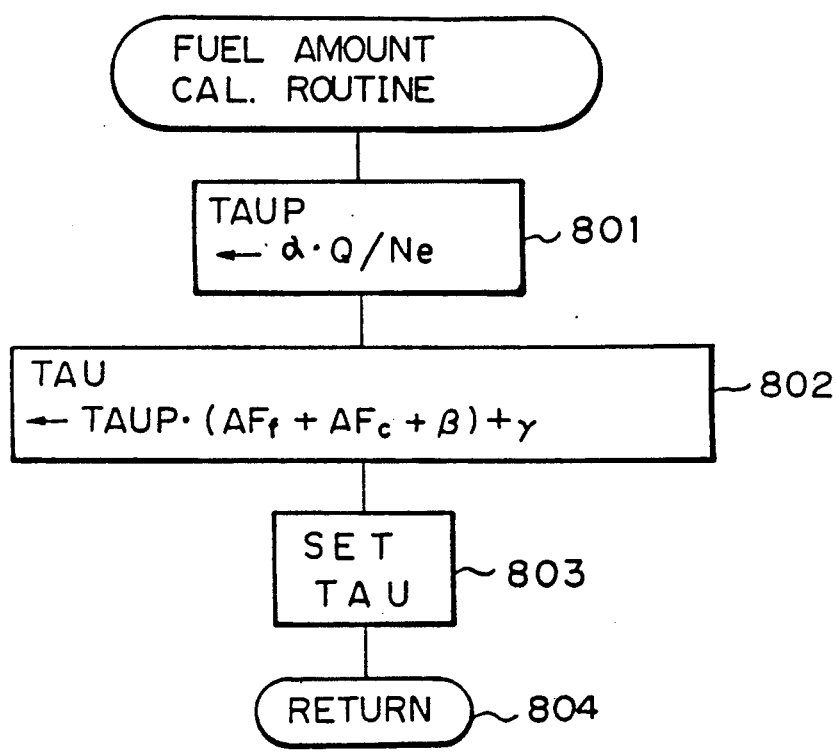

FIG. 8 is a routine for calculating a fuel injection amount TAU executed at a predetermined crank angle such as 360° CA.

At step 801, a base fuel injection amount TAUP is calculated by using the intake air amount data Q and the engine speed data $N_e$ store in the RAM 105. That is TAUP←$\alpha \cdot Q/N_e$ where $\alpha$ is a constant. At step 802, a final fuel injection amount TAU is calculated by $$TAU \leftarrow TAUP \cdot (AF_f + AF_c + \beta) + \gamma$$

where $\beta$ and $\gamma$ are correction factors determined by other parameters such as the voltage of the battery and the temperature of the intake air. At step 803, the final fuel injection amount TAU is set in the down counter 107, and in addition, the flip-flop 108 is set to initiate the activation of the fuel injection valve 7. This routine is completed by step 804. Note that, as explained above, when a time corresponding to the amount TAU has passed, the flip-flop 109 is reset by the borrow-out signal of the down counter 108 to stop the activation of the fuel injection valve 7.

The routines of FIGS. 4, 6, and 8 will be further explained with reference to FIGS. 9A, 9B, 9C, and 9D. As shown in FIG. 9A, before time $t_1$, the air-fuel ratio is deviated to the lean side ($V_{OX} < V_R$), and only the coarse-adjusting term $AF_c$ is controlled as shown in FIGS. 9B and 9C. That is, this time is an integration time. For a time between $t_1$ and $t_2$, although the air-fuel ratio is converged to the stoichiometric air-fuel ratio, the air-fuel ratio is still on the lean side. During this time, the fine-adjusting term $AF_f$ is controlled at every reversion of the air-fuel ratio ($V_{OX}$) as shown in FIG. 9B, and simultaneously, since the reversion period thereof is relatively long, the coarse-adjusting term $AF_c$ is also controlled as shown in FIG. 9C. After time $t_2$, the air-fuel ratio is completely converged to the stoichiometric air-fuel ratio, so that the output of the $O_2$ sensor 14 frequently crosses the reference voltage $V_R$, i.e., the reversion period of the output $V_{OX}$ of the $O_2$ sensor 14 is relatively small. As a result, the control of the coarse-adjusting term $AF_c$ is prohibited, and it is held at the value as shown in FIG. 9C.

The air-fuel ratio is controlled in accordance with a sum $AF_F + AF_C$ as shown in FIG. 9D. Therefore, when the controlled air-fuel ratio reaches the stoichiometric air-fuel ratio by the control of the coarse-adjusting term $AF_c$, the control is transferred to a self-duty ratio control by the output $V_{OX}$ of the $O_2$ sensor 14, i.e., the control of the fine-adjusting term $AF_f$. As a result, the reversion period of the output $V_{OX}$ of the $O_2$ sensor 14 is shortened to maintain the frequency of the controlled air-fuel ratio at a high value, thereby exhibiting a full cleaning effect of the catalyst converter 12 at its maximum capability. Also, the overcorrection of the controlled air-fuel ratio due to the response delay of the $O_2$ sensor 14 is avoided by prohibiting the coarse-adjusting term $AF_c$, improving the convergence of the controlled air-fuel ratio to the stoichiometric air-fuel ratio.

Figure 10A:
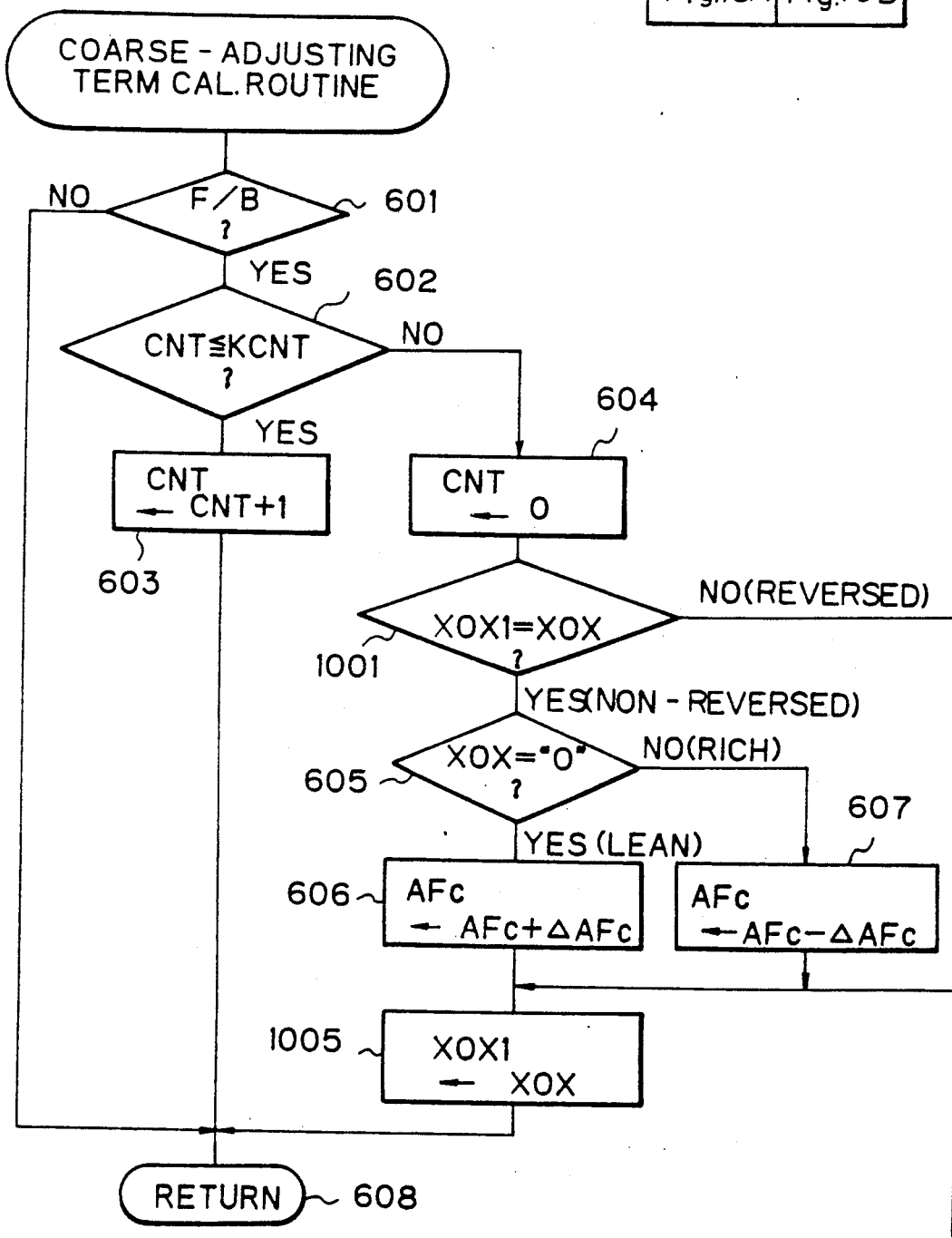
Figure 10B:
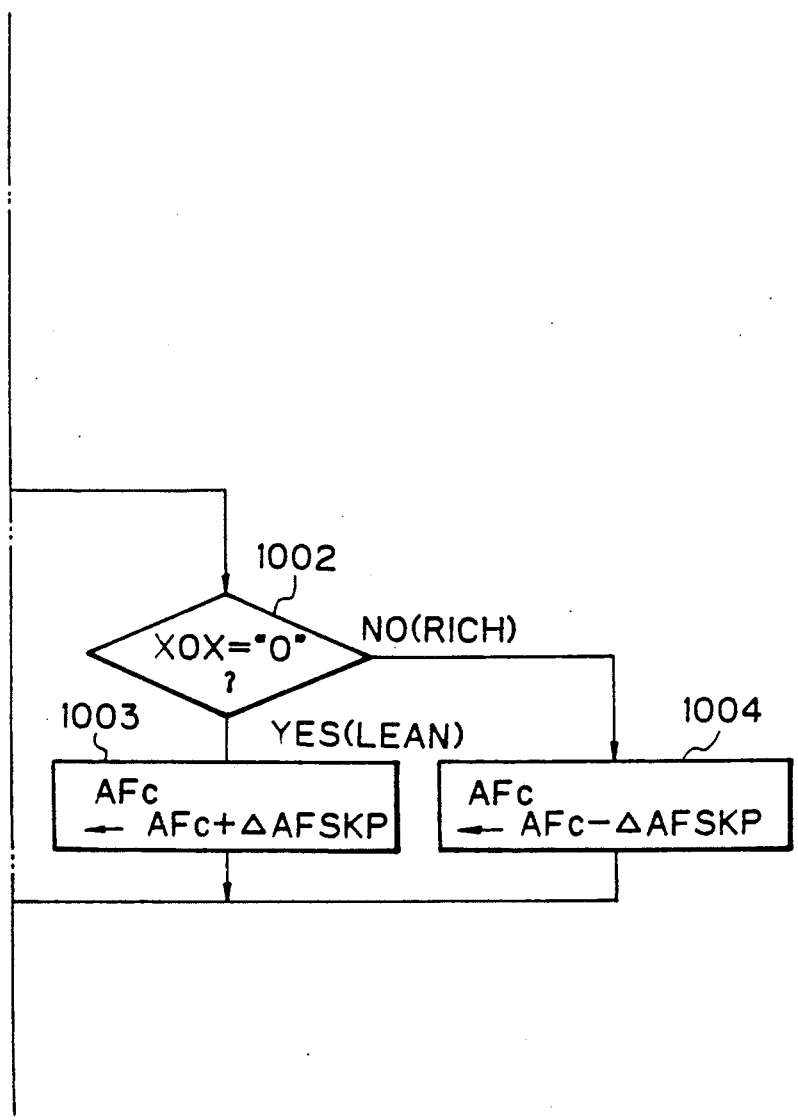
Figures 11A, 11B, 11C, 11D:
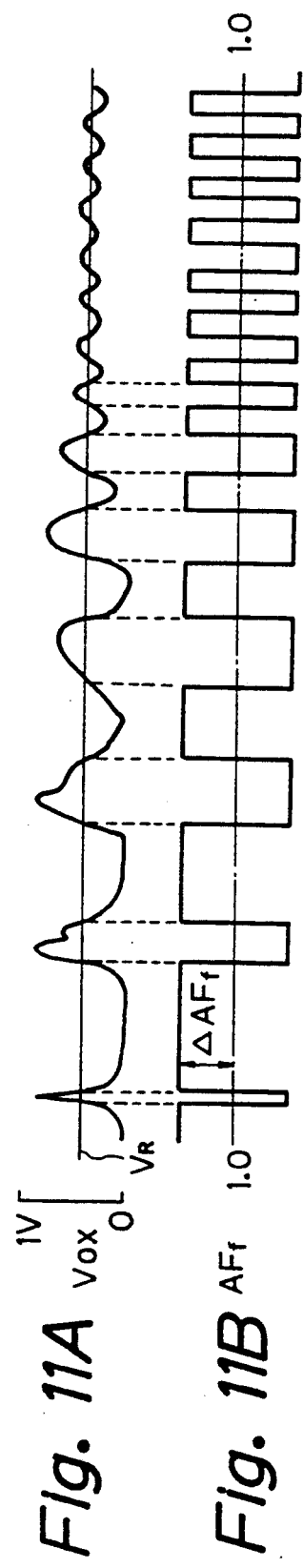
FIGS. 11A, 11B, 11C, and 11D are timing diagrams explaining the flow chart of FIG. 10.

In FIG. 10, which is a modification of FIG. 6, steps 1001 through 1005 are added to FIG. 6, to introduce a skip operation into the control of the coarse-adjusting term $AF_c$. That is, every time the counter value CNT reaches the definite value KCNT, the control at step 602 proceeds to steps 604 to 606 and 1001 to 1005. In this case, when the air-fuel ratio is not reversed, the control proceeds to step 605 to 606 which perform an integrating operation using the small value $\Delta AF_c$ upon the coarse-adjusting term $AF_c$, and when the air-fuel ratio is reversed, the control proceeds to steps 1002 to 1004 which perform a skip operation using a large value $\Delta AFSKP$ upon the coarse-adjusting term $AF_c$. For example, as shown in FIGS. 11A through 11D, at times $t_1$, $t_2$, $t_3$, and $t_4$, the air-fuel ratio is retained on the lean side (XOX=XOX1="0"), and therefore, the control at step 1001 proceeds to steps 605 and 606, which increase the coarse-adjusting term $AF_c$ by the small value $\Delta AF_c$. Also, at time $t_6$, the air-fuel ratio is retained on the rich side (XOX=XOX1="1"), and therefore, the control at step 1001 proceeds to steps 605 and 607 which decrease the coarse-adjusting term $AF_c$ by the small value $\Delta AF_c$. Conversely, at times $t_7$ and $t_9$, since the air-fuel ratio is reversed from the rich side (XOX1="1") to the lean side (XOX="0"), the control at step 1001 proceeds to steps 1102 and 1103 which increase the coarse-adjusting term $AF_c$ by the large value $\Delta AFSKP$.

At times $t_5$ and $t_8$, since the air-fuel ratio is reversed from the lean side (XOX1="0") to the rich side (XOX="1"), the control at step 1001 proceeds to steps 1102 and 1104 which decrease the coarse-adjusting term $AF_c$ by the large value $\Delta AFSKP$.

Thus, the convergence of the coarse-adjusting term $AF_c$ is further improved by the introduction of the above-mentioned skip control into the control of $AF_c$.

To exhibit a superior cleaning effect of the catalyst converter 12, a self-oscillating term (forcibly-oscillating term) $AF_s$ is introduced into the control of the air-fuel ratio, as explained below.

In FIG. 12, which is a routine for calculating a self-oscillating term $AF_s$ executed at a time such as 4 ms, at step 1201 it is determined whether or not all of the air-fuel ratio feedback conditions are satisfied in the same way as at step 401 of FIG. 4. As a result, when one or more of the air-fuel ratio feedback conditions are not satisfied, the control proceeds directly to step 1210, and if all of the air-fuel ratio feedback conditions are satisfied, the control proceeds to step 1202. At step 1202, it is determined whether or not a counter value CNTS has reached T/2, where T is a period of the self-oscillating term $AF_s$. That is, since the counter value CNTS is counted up by +1 at step 1209, the control at step 1202 proceeds to steps 1203 to 1208 at every time T/2.

Steps 1203 to 1208 will be explained. At step 1203, the counter value CNTS is cleared, and then at step 1204, it is determined whether or not a self-oscillating flag XSIC is "0". As a result, when XSIC="0", the control proceeds to step 1205 which causes the self-oscillating term $AF_s$ to be $-\Delta AF_s$ (definite value), thus reversing the self-oscillating flag XSIC at step 1206. As a result, the counter value CNTS again reaches T/2 and the control at step 1204 proceeds to step 1207, which causes the self-oscillating term $AF_s$ to be $\Delta AF_s$, thus reversing the self-oscillating flag XSIC at step 1208.

Then, this routine is completed at step 1210.

Thus, according to the routine of FIG. 12, a self-oscillating term $AF_s$ having a definite amplitude $\Delta AF_s$ and a period T is generated as shown in FIG. 14B, which will be later explained.

Figure 13:
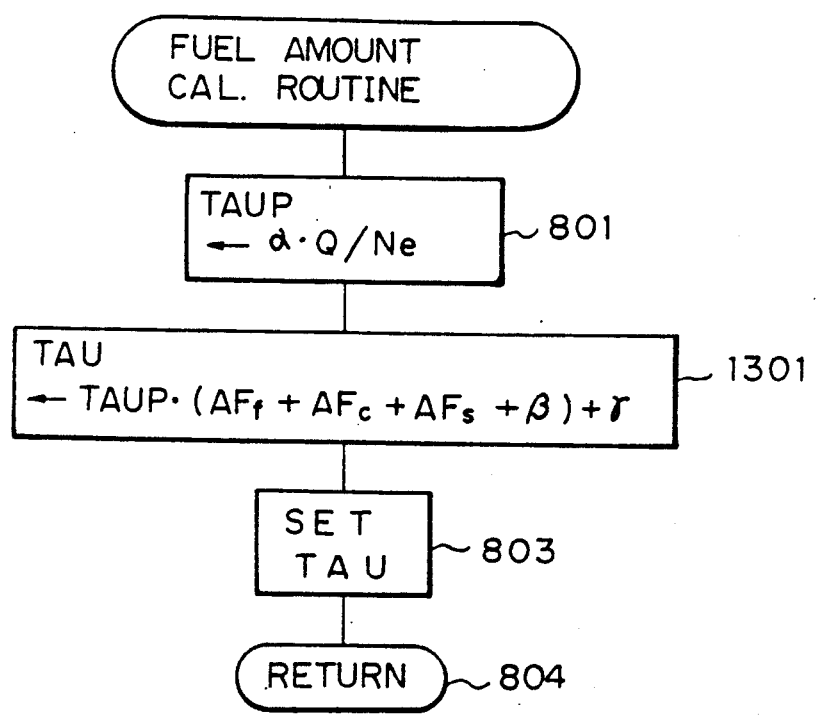

In FIG. 13, which is another routine for calculating a fuel injection amount, step 1301 is provided instead of step 801 of FIG. 8, thus introducing the self-oscillating term $AF_s$ into the fuel injection amount TAU. That is, at step 1301, the final fuel injection amount TAU is calculated by $$TAU \leftarrow TAPU \cdot (AF_f + AF_c + AF_s + \beta) + \gamma$$

The routines of FIGS. 4, 6, 12, and 13 will be explained with reference to FIGS. 14A, 14B, 14C, and 14D. The sum of the fine-adjusting term $AF_f$ and the self-oscillating term $AF_s$ as shown in FIG. 14C serves as the fine-adjusting term $AF_f$ of FIG. 9B. In this case, the amplitude $\Delta AF_s$ and the period T of the self-oscillating term $AF_s$ are determined to exhibit a superior cleaning effect of the catalyst converter 12 and minimize the fluctuation of the controlled air-fuel ratio by the introducing of the self-oscillating term $AF_s$.

Figure 15B:
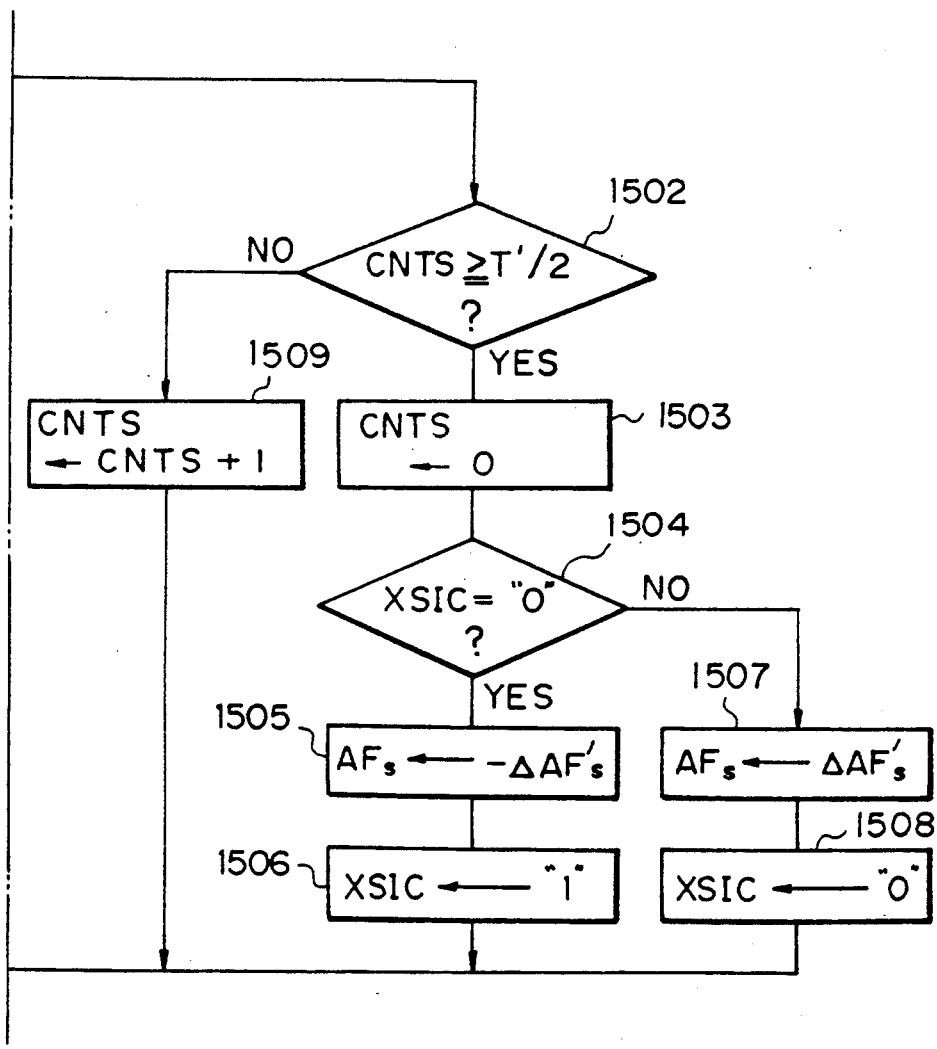

In FIG. 15, which is a modification of FIG. 12, steps 1501 to 1509 are added to FIG. 12. That is, if the engine is in a non-idling state (LL="0"), the routine of FIG. 15 is the same as that of FIG. 12. Conversely, if the engine is in an idling state (LL="1"), the control at step 1501 proceeds to steps 1502 through 1509 which correspond to steps 1201 through 1209, respectively. By steps 1502 to 1509, a self-oscillating term $AF_s$ having a definite amplitude $\Delta AF_s$, smaller than the amplitude $\Delta AF_s$ and a period T' larger than the period T is generated. That is, as shown in FIGS. 16A and 16B, in an idling state, the amplitude of the self-oscillating term $AF_s$ is decreased and the period thereof is increased, to reduce the fluctuation of the controlled air-fuel ratio.

Figure 17:
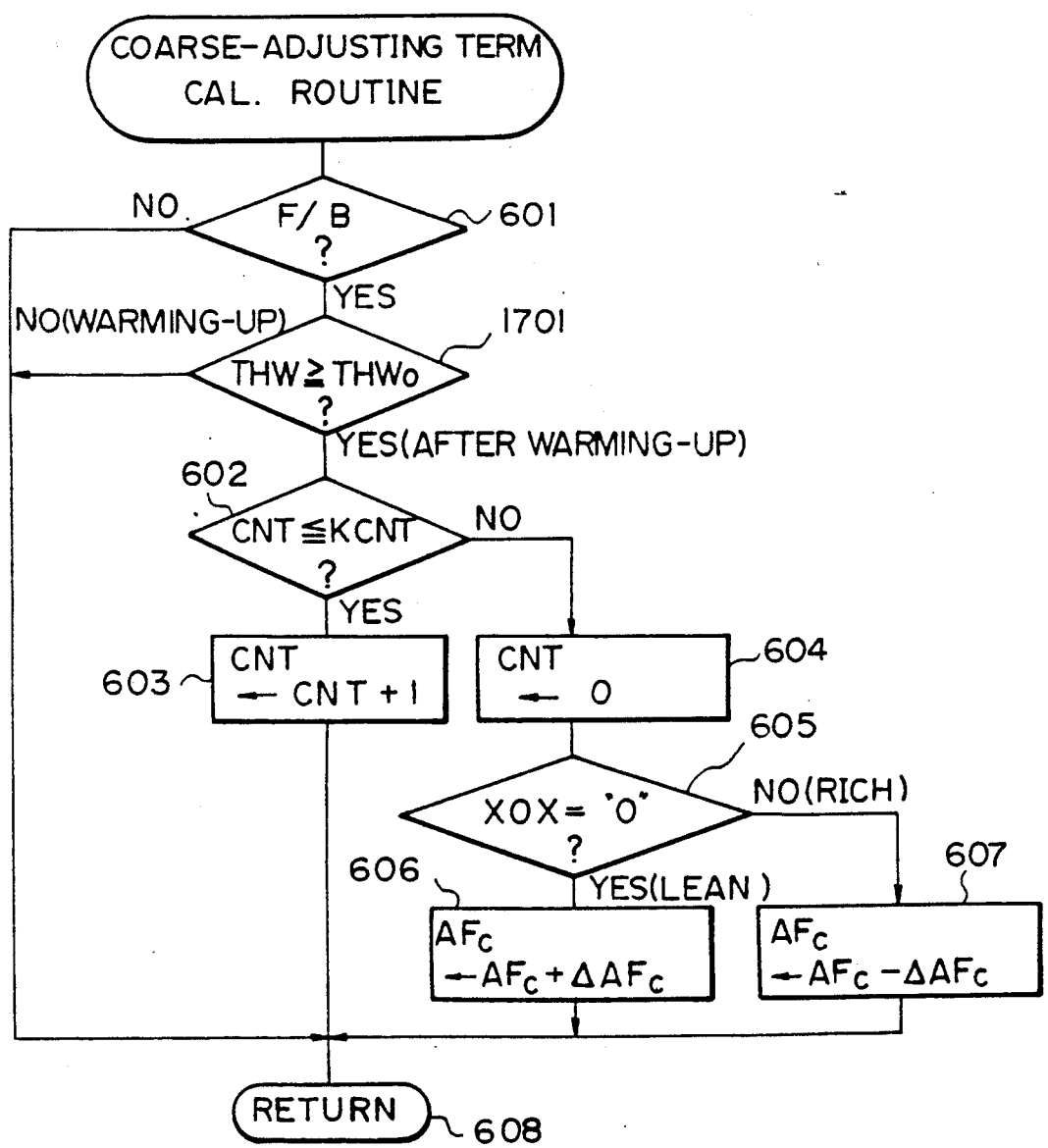

In FIG. 17, which is another modification of FIG. 6, a step 1701 is added to FIG. 6. That is, at step 1701, the coolant temperature data THW is read out of the RAM 105, and it is determined whether or not $THW<THW_0$ (such as 80° C.) is satisfied, i.e., whether the engine is in a warming-up state or in an after-warming-up state. As a result, when the engine is in a warming-up state, the control also proceeds directly to step 608, thus prohibiting the renewal of the coarse-adjusting term $AF_c$. That is, when the engine is in a warming-up state, the catalyst converter 12 is made inactive to affect the output $V_{OX}$ of the $O_2$ sensor 14. Thus, the renewal of the coarse-adjusting term $AF_c$ is prohibited, to avoid an erroneous control of the air-fuel ratio.

In FIG. 18, which is another modification of FIG. 12, steps 1801 through 1803 are added to FIG. 12. That is, at step 1801, the coolant temperature data THW is read out of the RAM 105, and it is determined whether $THW<THW_0$ is satisfied, in the same way as at step 1701 of FIG. 17. As a result, when the engine is in a warming-up state ($THW<THW_0$), the control proceeds to step 1802 which causes the amplitude $\Delta AF_s$ of the self-oscillating term $AF_s$ to be $\Delta AF_{s1}$, and when the engine is in an after-warming-up state ($THW \geq THW_0$), the control proceeds to step 1803 which causes the amplitude $\Delta AF_s$ to be $\Delta AF_{s2}$. In this case, $$\Delta AF_{s1} < \Delta AF_{s2}.$$

According to the routine of FIG. 18, the amplitude $\Delta AF_s$ of the self-oscillating $AF_s$ is smaller in a warming-up state than in an after-warming-up state, as shown in FIG. 19.

Figures 20A, 20B, 20C, 20D:
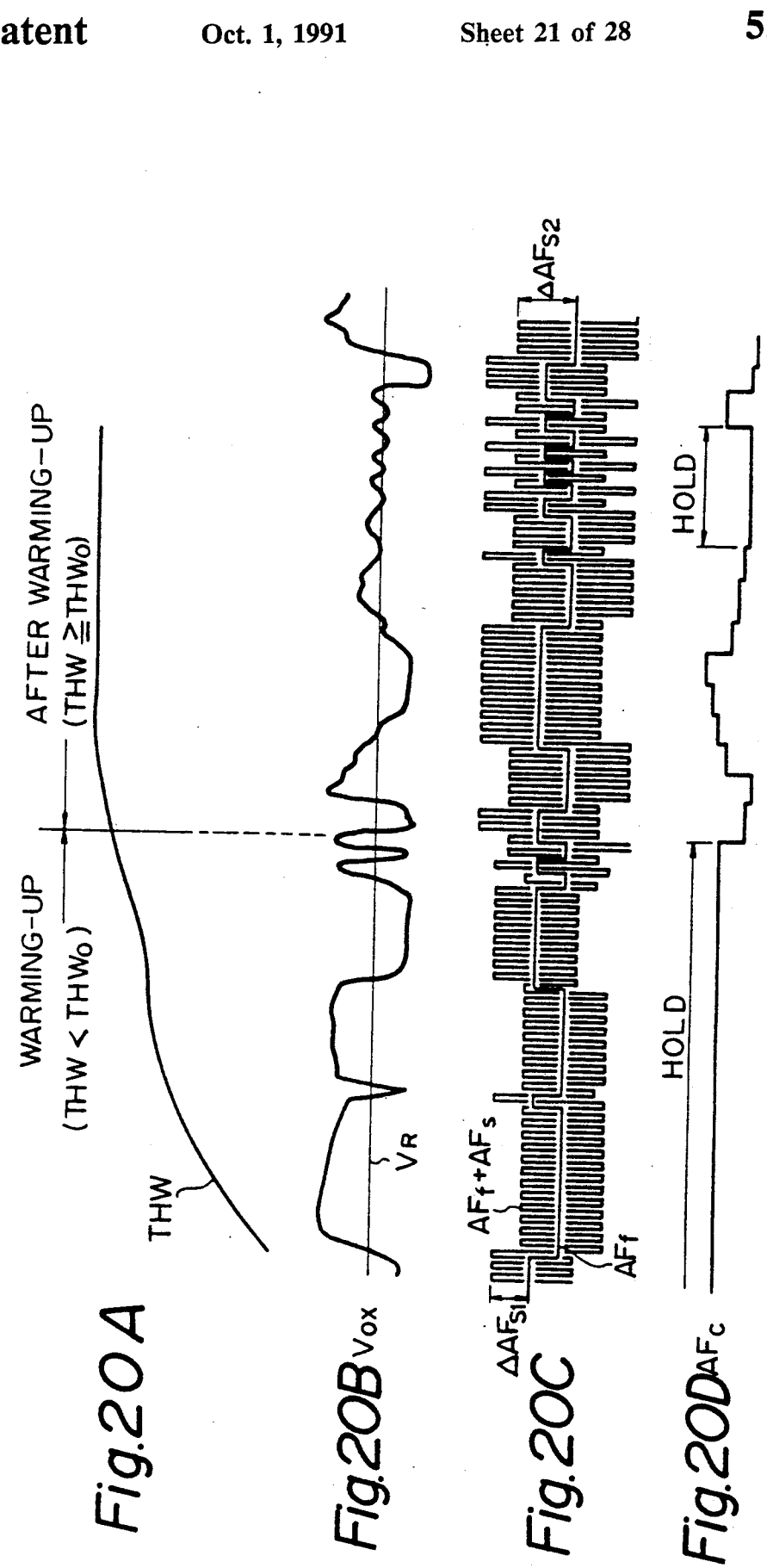
FIGS. 20A, 20B, 20C, and 20D are timing diagrams explaining the flow charts of FIGS. 4, 6, and 18.

The routines of FIGS. 4, 12, 17, and 18 are explained with reference to FIGS. 20A, 20B, 20C, and 20D. That is, in a warming-up state ($THW<THW_0$) as shown in FIG. 20A, since the catalyst converter 12 is not completely activated, the output $V_{OX}$ of the $O_2$ sensor 14 is unstable as shown in FIG. 20B. Therefore, in this state, the renewal of the coarse-adjusting term $AF_c$ is prohibited, and accordingly, the coarse-adjusting term $AF_c$ is held at its value as shown in FIG. 20D. Also, the amplitude $\Delta AF_s$ of the self-oscillating term $AF_s$ is made small ($\Delta AF_s = \Delta AF_{s1}$) as shown in FIG. 20C, and therefore, even when the friction of the engine is large, the fluctuation of the torque of the engine is reduced, thereby avoiding a reduction of the drivability.

In an after-warming-up state (THW≧THW$_0$), since the friction of the engine becomes large, so that the amplitude $\Delta AF_s$ of the self-oscillating term $AF_s$ is made large ($\Delta AF_s = \Delta AF_{s2}$), as shown in FIG. 20C. Also, the renewal of the coarse-adjusting term $AF_c$ is carried out in accordance with the output $V_{OX}$ of the O$_2$ sensor 14, to converge the controlled air-fuel ratio to the stoichiometric air-fuel ratio as shown in FIG. 20D. Further, in this case, the control of the fine-adjusting term $AF_f$ is carried out at every reversion of the output $V_{OX}$ of the O$_2$ sensor 14 as shown in FIG. 20C. Then, when the controlled air-fuel ratio reaches the stoichiometric air-fuel ratio, the renewal of the coarse-adjusting term $AF_c$ is prohibited (held) as shown in FIG. 20D. As a result, an overcorrection of the air-fuel ratio due to the delay of the O$_2$ sensor 14 can be avoided, to improve the convergence of the controlled air-fuel ratio.

Further, to avoid the fluctuation of the air-fuel ratio due to the fluctuation of the O$_2$ storage effect of the catalyst converter 12, an O$_2$ storage term $AF_{CCRO}$ is introduced into the control of the air-fuel ratio, which will be explained below.

Figure 21:
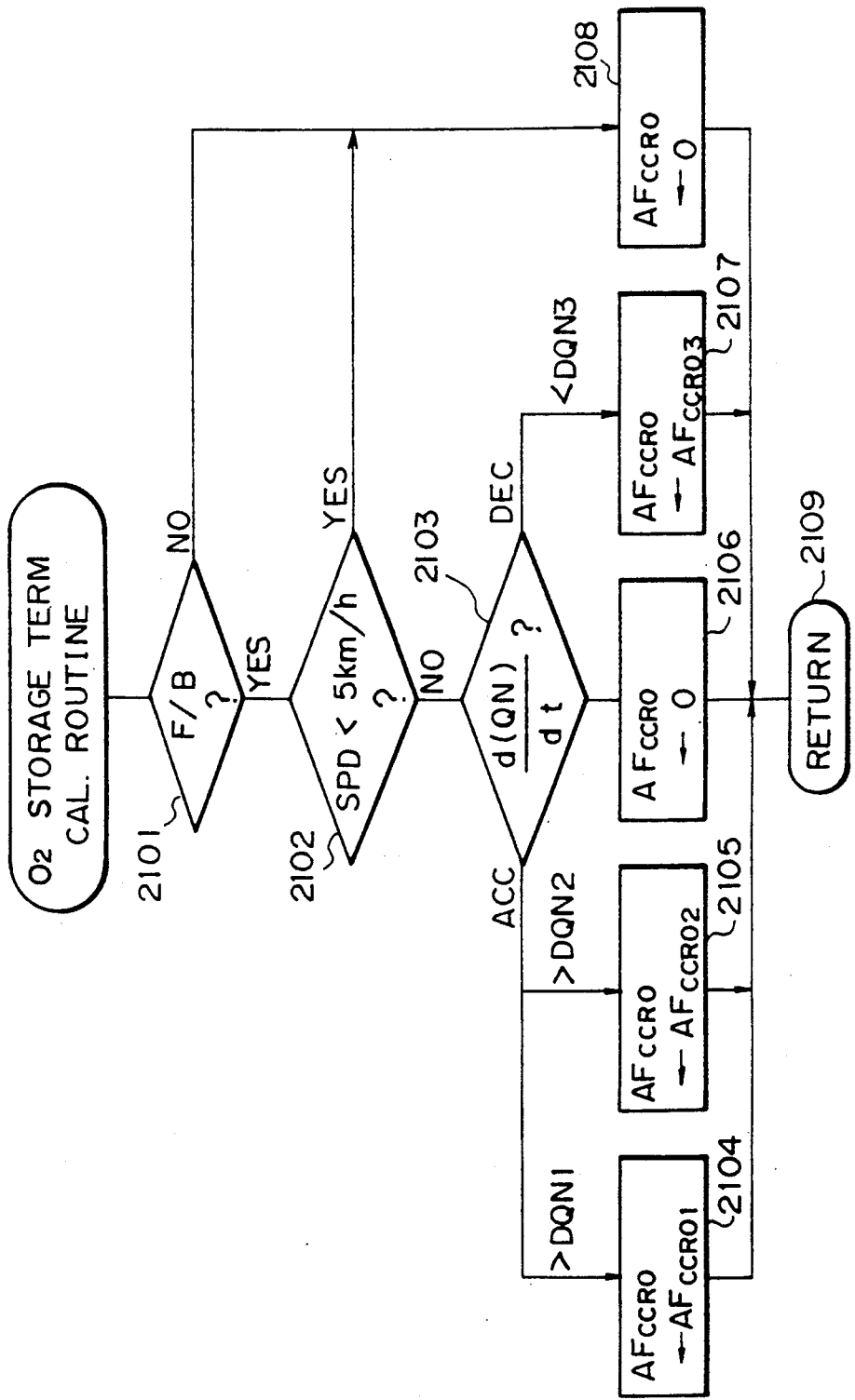

In FIG. 21, which is a routine for calculating an O$_2$ storage term $AF_{CCRO}$ executed at a predetermined time such as 16 ms, at step 2101, it is determined whether or not all of the air-fuel ratio feedback control conditions are satisfied, in the same way as at step 401 of FIG. 4. As a result, when one or more of the air-fuel ratio feedback conditions are not satisfied, the control proceeds to step 2108 which causes the O$_2$ storage term $AF_{CCRO}$ to be 0, and if all of the air-fuel ratio feedback conditions are satisfied, the control proceeds to step 2102. At step 2102, the vehicle speed data SPD is fetched from the vehicle speed forming circuit 111, and it is determined whether or not SPD is lower than a predetermined value such as 5 km/h. As a result, when the vehicle speed SPD is lower than 5 km/h, the control also proceeds to step 2108 which makes the O$_2$ storage term $AF_{CCRO}$ 0. Otherwise, the control proceeds to step 2103 which calculates an intake air amount QN per one engine revolution by $$QN \leftarrow Q/Ne$$

Also, a change of QN is calculated by $$\frac{d(QN)}{dt} \leftarrow QN - QNO$$

where QNO is a previous value of QN. Then, a large acceleration state, a small acceleration state, and a deceleration state are determined in accordance with $d(QN)/dt$. As a result, when $d(QN)/dt > DQN1$ (large acceleration state), the control proceeds to step 2104, which causes the O$_2$ storage term $AF_{CCRO}$ to be $AF_{CCRO1}$ (>0). Also, when $d(QN)/dt > DQN2$ (small acceleration state), the control processed to step 2105 which causes the O$_2$ storage term $AF_{CCRO}$ to be $AF_{CCRO2}$ ($0 < AF_{CCRO2} < AF_{CCRO1}$). Further, when $d(QN)/dt < DQN3$ (deceleration state), the control proceeds to step 2107 which causes the O$_2$ storage term $AF_{CCRO}$ to be $AF_{CCRO3}$ (<0), and in a steady state ($DQN3 \leq d(QN) \leq DQN2$), the control proceeds to step 2106 which causes the O$_2$ storage term $AF_{CCRO}$ to be 0.

Then, the routine of FIG. 21 is completed by step 2109.

That is, when the acceleration rate of the engine is large, the air-fuel ratio upstream of the catalyst converter 12 is greatly deviated to the rich side, to change the O$_2$ storage amount of the catalyst converter 12. Therefore, if the relationship between the O$_2$ storage amount of the catalyst converter 12 and the value $d(QN)/dt$ is recognized in advance, the O$_2$ storage amount is monitored by the value $d(QN)/dt$, to calculate the O$_2$ storage term $AF_{CCRO}$ in accordance with the value $d(QN)/dt$.

Figure 22:
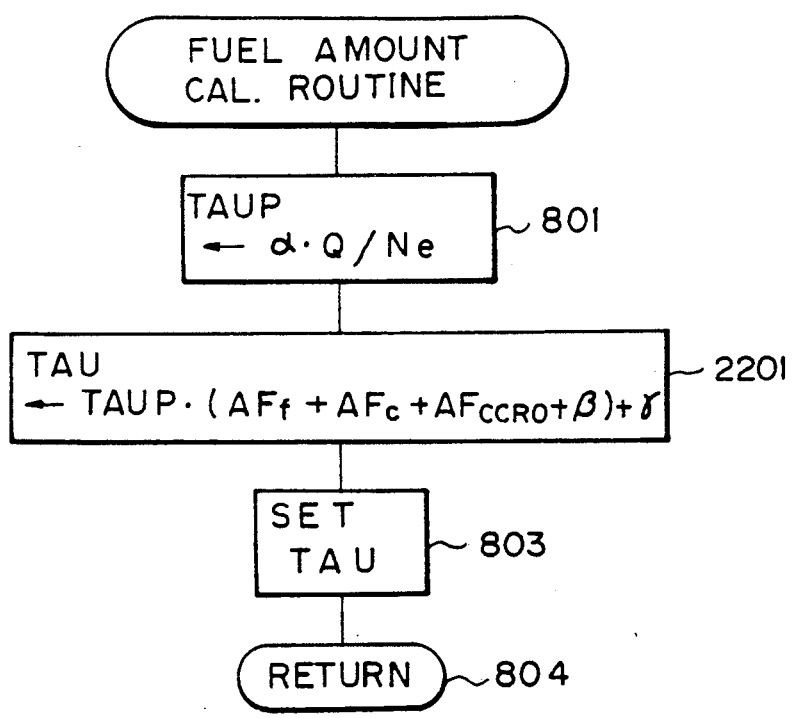

In FIG. 22, which is a further modification of FIG. 8, a step 2201 is provided instead of step 802 of FIG. 8. That is at step 2201, a final fuel injection amount TAU is calculated by $$TAU \leftarrow TAUP \cdot (AF_f + AF_c + AF_{CCRO} + \beta) + \gamma$$

The routines of FIGS. 4, 6, 21, and 22 will be explained with reference to FIGS. 23A, 23B, 23C. That is, a sum of the fine-adjusting term $AF_f$ and the O$_2$ storage term $AF_{CCRO}$ serves as the fine-adjusting term $AF_f$ of FIG. 9B. Therefore, even when the O$_2$ storage effect of the catalyst converter 12 is changed by a transient state such as an acceleration state or a deceleration state, an asynchronous fuel increment, a change of shift, deposit at intake valves, a delay in detection of the intake air amount, or the like, the delay of control of the air-fuel ratio is compensated, thus improving the convergence of the air-fuel ratio downstream of the catalyst converter 12, to reduce the emissions.

Figure 24:
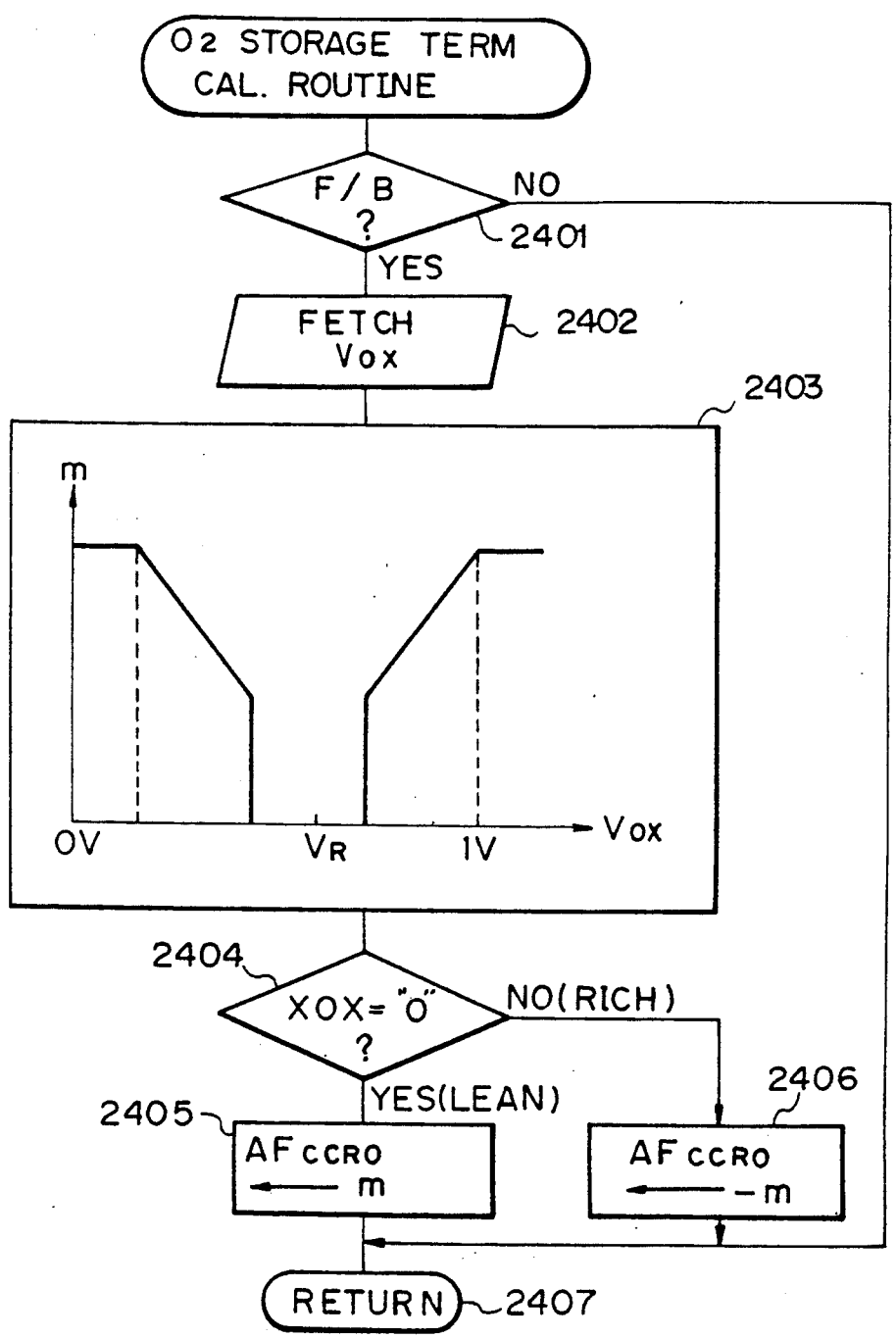

In FIG. 24, which is a modification of FIG. 21, the output $V_{OX}$ of the O$_2$ sensor 14 is used instead of the parameter $d(QN)/dt$. That is, at step 2401, it is determined whether or not all of the air-fuel ratio feedback conditions are satisfied in the same way as at step 401 of FIG. 4. Only when all the air-fuel ratio feedback conditions are satisfied does to the control proceed to steps 2402 through 2406. At step 2402, an A/D conversion is performed upon the output $V_{OX}$ of the O$_2$ sensor 14, and a value m is calculated from a one-dimensional map using the parameter $V_{OX}$ stored in the ROM 104. Note that the value m is larger when the output $V_{OX}$ of the O$_2$ sensor 14 is far from the reference voltage $V_R$ corresponding to the stoichiometric air-fuel ratio ($\lambda = 1$). Also, the value m can be discretely changed in accordance with the output $V_{OX}$ of the O$_2$ sensor 14, and in this case, a calculation at step 2403 can be attained by a simple comparison operation. Next, at step 2404, it is determined whether or not the air-fuel ratio downstream of the catalyst converter 12 is on the lean side (XOX = "0"). As a result, if on the lean side (XOX = "0"), the control proceeds to step 2405 which causes the O$_2$ storage term $AF_{CCRO}$ to be m, and if on the rich side (XOX = "1"), the control proceeds to step 2406 which causes the O$_2$ storage term $AF_{CCRO}$ to be $-m$.

This routine of FIG. 24 is then completed by step 2407.

Thus, since the O$_2$ sensor 14 is located downstream of the catalyst converter 12, the O$_2$ storage amount thereof can be monitored by the output $V_{OX}$ of the O$_2$ sensor 14, thus calculating the O$_2$ storage term $AF_{CCRO}$ in accordance with the output $V_{OX}$ of the O$_2$ sensor 14.

Figure 25:
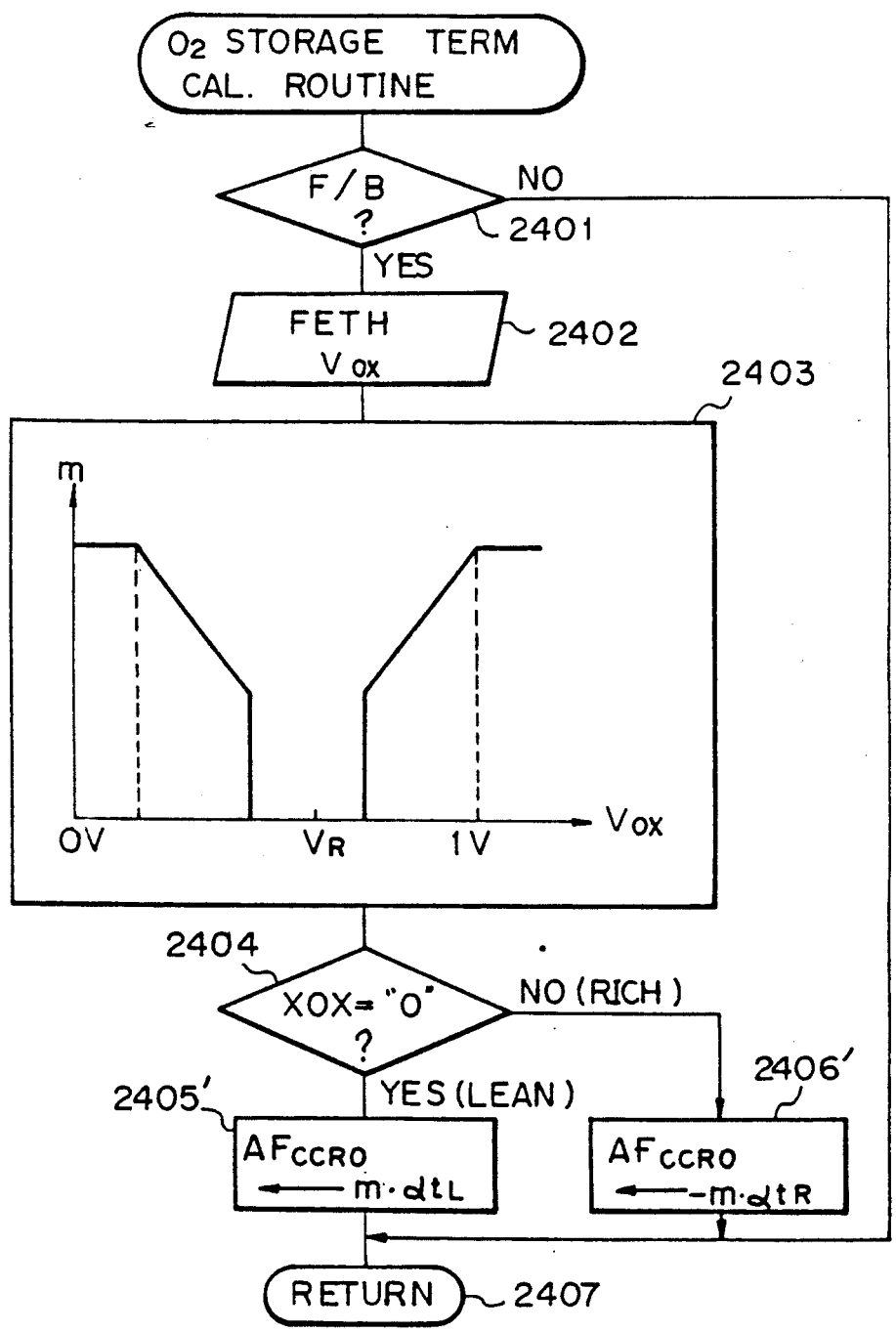

In FIG. 25, which is a modification of FIG. 24, steps 2405' and 2406' are provided instead of steps 2405 and

2406 of FIG. 24. Namely, at steps 2405′ and 2406′, the O$_2$ storage term AF$_{CCRO}$ is calculated by $$AF_{CCRO} \leftarrow m \cdot \alpha_{tL}$$

$$AF_{CCRO} \leftarrow -m \cdot \alpha_{tR}$$

where $\alpha_{tL}$ is a lean duration of the output V$_{OX}$ of the O$_2$ sensor 14, and $\alpha tR$ is a rich duration of the output V$_{OX}$ of the O$_2$ sensor 14. That is, even when the output V$_{OX}$ of the O$_2$ sensor 14 remains at the same level, a longer duration of the output V$_{OX}$ of the O$_2$ sensor 14 at the same level creates a greater O$_2$ storage effect, thus increasing the O$_2$ storage term AF$_{CCRO}$.

Figure 26B:
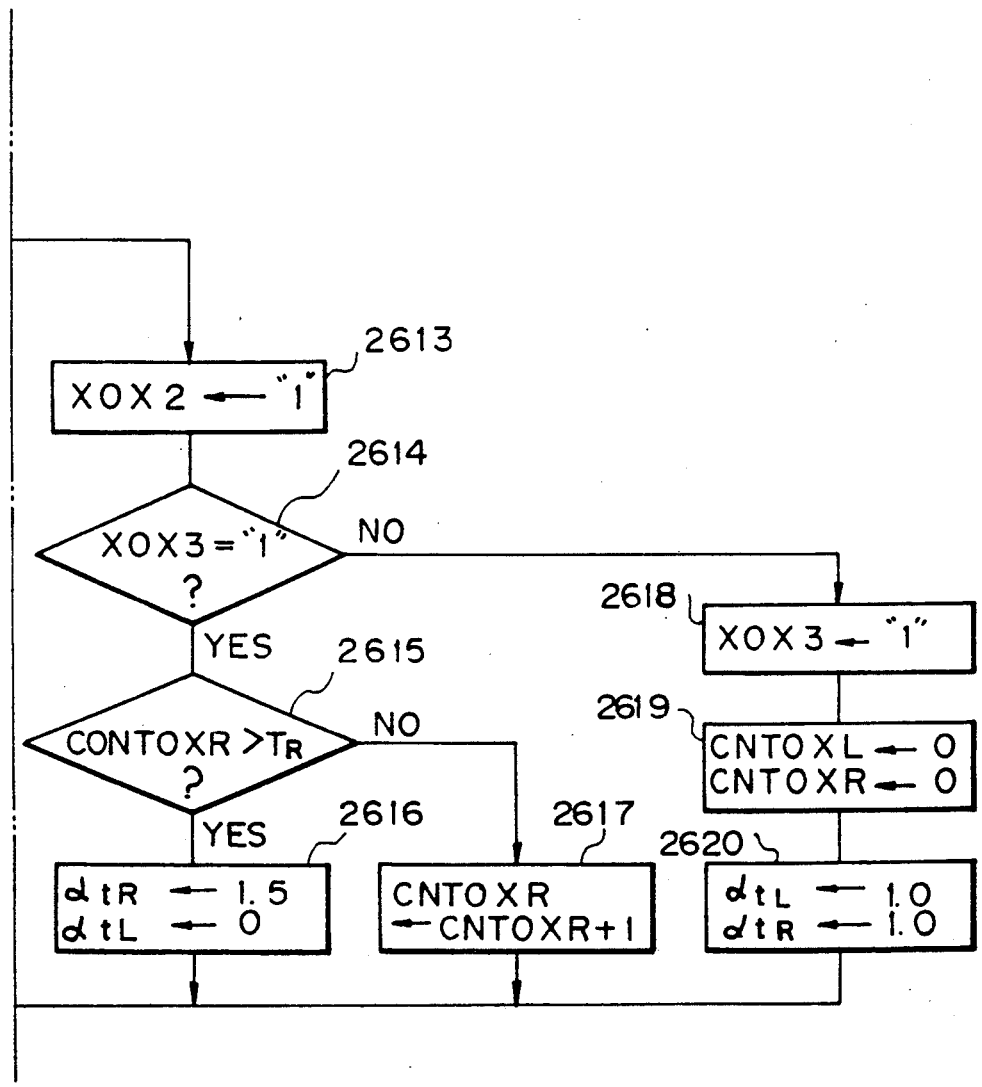

A lean duration $\alpha_{tL}$ and a rich duration $\alpha_{tR}$ are calculated by a routine as illustrated in FIG. 26, executed at a predetermined time such as 512 ms. At step 2601, it is determined whether or not all of the air-fuel ratio feedback conditions are satisfied, in the same way as at step 401 of FIG. 4, and at step 2602, it is determined whether or not the engine is in an idling state (LL="1"). As a result, only when all of the air-fuel ratio feedback conditions are satisfied, and the engine is not in an idling state (LL="0"), does the control proceed to steps 2603 through 2620.

At step 2603, an A/D conversion is performed upon the output V$_{OX}$ of the O$_2$ sensor 14, and at step 2604, it is determined whether or not V$_{OX} \leq$ V$_R$ (lean) is satisfied. As a result, when V$_{OX} \leq$ V$_R$ (lean), the control proceeds to step 2605, and then V$_{OX} >$ V$_R$ (rich), the control proceeds to step 2613.

At step 2605, an air-fuel ratio flag XOX2 is caused to be "0" (lean), and at step 2606, it is determined whether or not a previous air-fuel ratio flag XOX3 of the air-fuel ratio flag XOX2 is "0" (lean). As a result, when a lean air-fuel ratio state continues (XOX2= XOX3="0"), the control proceeds to step 2607 which determines whether or not a lean duration counter value CNTOXL exceeds a predetermined value T$_L$. Then, when CNTOXL>T$_L$, the control proceeds to step 2608 wherein:

$$\alpha_{tL} \leftarrow 1.5$$

$$\alpha_{tR} \leftarrow 0$$

Otherwise, the control proceeds to step 2609 which counts up the lean duration counter CNTOXL by +1. On the other hand, if a reversion occurs in the air-fuel ratio flags XOX2 and XOX3 at step 2606, the control proceeds to step 2610 which causes the previous air-fuel ratio flag XOX3 to be "0" (lean). Then, at step 2611, the counter values CNTOXL and CNTOXR are cleared, and at step 2612, the values $\alpha_{tL}$ and $\alpha_{tR}$ are determined by $$\alpha_{tL} \leftarrow 1.0$$

$$\alpha_{tR} \leftarrow 1.0.$$

Similarly, at step 2613, the air-fuel ratio flag XOX2 is caused to be "1" (rich), and at step 2614, it is determined whether or not the previous air-fuel ratio flag XOX3 is "1" (rich). As a result, when a rich air-fuel ratio state continues (XOX2=XOX3="1"), the control proceeds to step 2615 which determines whether or not a rich duration counter value CNTOXR exceeds a predetermined value T$_R$. Then, when CNTOXR>T$_R$, the control proceeds to step 2616 wherein:

$$\alpha_{tR} \leftarrow 1.5$$

$$\alpha_{tL} \leftarrow 0$$

Otherwise, the control proceeds to step 2617 which counts up the rich duration counter CNTOXR by +1. On the other hand, if a reversion occurs in the air-fuel ratio flags XOX2 and XOX3 at step 2614, the control proceeds to step 2618 which causes the previous air-fuel ratio flag XOX3 to be "1" (rich). Then, at step 2619, the counter values CNTOXL and CNTOXR are cleared, and at step 2620, the values $\alpha_{tL}$ and $\alpha_{tR}$ are determined by $$\alpha_{tL} \leftarrow 1.0$$

$$\alpha_{tR} \leftarrow 1.0.$$

Then, this routine is completed by step 2621.

Thus, when the lean duration defined by CNTOXL is large, the coefficient $\alpha_{tL}$ is made large, and when the rich duration defined by CNTOXR is large, the coefficient $\alpha_{tR}$ is made large.

Note that the present invention can be applied to a single O$_2$ sensor system where the O$_2$ sensor 14′ is located within the catalyst converter 12, as explained above.

Also, a Karman vortex sensor, a heat-wire type flow sensor, and the like can be used instead of the air flow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can also be applied to a carburetor type internal combustion engine in which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 801 of FIG. 8, at step 1301 of FIG. 13, or at step 2201 of FIG. 22 is determined by the carburetor itself, i.e., the intake air negative pressure and the engine speed, and the air amount corresponding to TAU is calculated at step 802 of FIG. 8, step 1301 of FIG. 13, or at step 2201 of FIG. 22.

Further, a CO sensor, a lean-mixture sensor or the like can also be used instead of the O$_2$ sensor.

As explained above, according to the present invention, after the controlled air-fuel ratio is converged into the stoichiometric air-fuel ratio, the frequency of the controlled air-fuel ratio is maintained at a high value by the output of the air-fuel ratio sensor per se, thereby exhibiting a full capability of the three-way catalysts. Also, in this case, since the control of the coarse-adjusting term is prohibited, overcorrection of the air-fuel ratio due to the delay of response of the air-fuel ratio sensor is avoided, to thereby improve the convergence characteristics of the controlled air-fuel ratio to the stoichiometric air-fuel ratio.

What is claimed is:

1. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:
gradually increasing a coarse-adjusting term when the output of said air-fuel ratio sensor is on the lean side with respect to the stoichiometric air-fuel ratio;
gradually decreasing said coarse-adjusting term when the output of said air-fuel ratio sensor is on the rich side with respect to the stoichiometric air-fuel ratio;
determining whether the output of said air-fuel ratio sensor is switched from the rich side to the lean side or vice versa;
remarkably increasing a fine-adjusting term when the output of said air-fuel ratio senor is switched from the rich side to the lean side;
remarkably decreasing said fine-adjusting term when the output of said air-fuel ratio sensor is switched from the lean side to the rich side;
determining whether or not a time of reversions of the output of said air-fuel ratio sensor is smaller than a predetermined time;
prohibiting the calculation of said coarse-adjusting term by the output of said air-fuel ratio sensor when said time of reversions is smaller than said predetermined time; and
adjusting an actual air-fuel ratio in accordance with said coarse-adjusting term and said fine-adjusting term.

2. A method as set forth in claim 1, further comprising the steps of:
remarkably increasing said coarse-adjusting term when the output of said air-fuel ratio sensor is switched from the rich side to the lean side; and
remarkably decreasing said coarse-adjusting term when the output of said air-fuel ratio sensor is switched from lean side to the rich side.

3. A method as set forth in claim 1, further comprising a step of generating a self-oscillating term having a predetermined amplitude and a predetermined period, said air-fuel ratio adjusting step adjusting said actual air-fuel ratio in accordance with said self-oscillating term.

4. A method as set forth in claim 3, further comprising the steps of:
determining whether or not said engine is in an idling state;
decreasing said predetermined amplitude of said self-oscillating term when said engine is in said idling state; and
increasing said predetermined period of said self-oscillating term when said engine is in said idling state.

5. A method as set forth in claim 1, further comprising the steps of:
determining whether or not said engine is in a warming-up state; and
prohibiting the calculation of said coarse-adjusting term by the output of said air-fuel ratio sensor when said engine is in said warming-up state.

6. A method as set forth in claim 3, further comprising the steps of:
determining whether of not said engine is in a warming-up state; and
decreasing said amplitude of said self-oscillating term when said engine is in said warming-up state.

7. A method as set forth in claim 1, further comprising a step of calculating an $O_2$ storage term corresponding to an $O_2$ storage amount in said three-way catalyst converter,
said air-fuel ratio adjusting step adjusting said actual air-fuel ratio in accordance with said $O_2$ storage term.

8. A method as set forth in claim 7, wherein said $O_2$ storage term calculating step calculates said $O_2$ storage term in accordance with a change of a load of said engine.

9. A method as set forth in claim 7, wherein said $O_2$ storage term calculating step calculates said $O_2$ storage term in accordance with the output of said air-fuel ratio sensor.

10. A method as set forth in claim 9, wherein said $O_2$ storage term calculating step increases said $O_2$ storage term when the output of said air-fuel ratio sensor continues a lean state for a predetermined period, and decreases said $O_2$ storage term when the output of said air-fuel ratio sensor continues a rich state for said predetermined period.

11. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising:
means for gradually increasing a coarse-adjusting term when the output of said air-fuel ratio sensor is on the lean side with respect to the stoichiometric air-fuel ratio;
means for gradually decreasing said coarse-adjusting term when the output of said air-fuel ratio sensor is on the rich side with respect to the stoichiometric air-fuel ratio;
means for determining whether the output of said air-fuel ratio sensor is switched from the rich side to the lean side or vice versa;
means for remarkably increasing a fine-adjusting term when the output of said air-fuel ratio sensor is switched from the rich side to the lean side;
means for remarkably decreasing said fine-adjusting term when the output of said air-fuel ratio sensor is switched from the lean side to the rich side;
means for determining whether or not a time of reversions of the output of said air-fuel ratio sensor is smaller than a predetermined time;
means for prohibiting the calculation of said coarse-adjusting term by the output of said air-fuel ratio sensor when said time of reversions is smaller than said predetermined time; and
means for adjusting an actual air-fuel ratio in accordance with said coarse-adjusting term and said fine-adjusting term.

12. An apparatus as set forth in claim 11, further comprising:
means for remarkably increasing said coarse-adjusting term when the output of said air-fuel ratio sensor is switched from the rich side to the lean side; and means for remarkably decreasing said coarse-adjusting term when the output of said air-fuel ratio sensor is switched from lean side to the rich side.

13. An apparatus as set forth in claim 11, further comprising:
   means for generating a self-oscillating term having a predetermined amplitude and a predetermined period,
   said air-fuel ratio adjusting means adjusting said actual air-fuel ratio in accordance with said self-oscillating term.

14. An apparatus as set forth in claim 13, further comprising:
   means for determining whether or not said engine is in an idling state;
   means for decreasing said predetermined amplitude of said self-oscillating term when said engine is in said idling state; and
   means for increasing said predetermined period of said self-oscillating term when said engine is in said idling state.

15. An apparatus as set forth in claim 11, further comprising:
   means for determining whether or not said engine is in a warming-up state; and
   means for prohibiting the calculation of said coarse-adjusting term by the output of said air-fuel ratio sensor when said engine is in said warming-up state.

16. An apparatus as set forth in claim 13, further comprising:
   means for determining whether or not said engine is in a warming-up state; and
   means for decreasing said amplitude of said self-oscillating term when said engine is in said warming-up state.

17. An apparatus as set forth in claim 11, further comprising:
   means for calculating an $O_2$ storage term corresponding to an $O_2$ storage amount in said three-way catalyst converter,
   said air-fuel ratio adjusting means adjusting said actual air-fuel ratio in accordance with said $O_2$ storage term.

18. An apparatus as set forth in claim 17, wherein said $O_2$ storage term calculating means calculates said $O_2$ storage term in accordance with a change of a load of said engine.

19. An apparatus as set forth in claim 17, wherein said $O_2$ storage term calculating means calculates said $O_2$ storage term in accordance with the output of said air-fuel ratio sensor.

20. An apparatus as set forth in claim 19, wherein said $O_2$ storage term calculating means increases said $O_2$ storage term when the output of said air-fuel ratio sensor continues a lean state for a predetermined period, and decreases said $O_2$ storage term when the output of said air-fuel ratio sensor continues a rich state for said predetermined period.

* * * * *

UNITED STATES PATENT AND TRADEMARK OFFICE
CERTIFICATE OF CORRECTION

PATENT NO.  : 5,052,177
DATED       : October 1, 1991
INVENTOR(S) : Mitsuhiro Nada It is certified that error appears in the above-identified patent and that said Letters Patent is hereby corrected as shown below:

On the Title page, item [57] in the Abstract, line 7, change "ration" to --ratio--. and line 8, change "ration" to --ratio--.
Column 6, line 6, after "in accordance" insert --with--.
Column 8, line 6, change "store" to --stored--.
Column 9, line 59-60, unbold "which will be later explained".
Column 9, line 68 change " TAPU" to --TAUP--.
Column 10, line 56, after "oscillating" insert --term--.
Column 13, line 9, change "$\alpha tR$" to --$\alpha_{tR}$--.
Column 15, line 43 before "lean" insert --the--.
Column 17, line 3, before "lean" insert --the--.

Signed and Sealed this

First Day of June, 1993

Attest:

MICHAEL K. KIRK

Attesting Officer

Acting Commissioner of Patents and Trademarks